US008301808B2

(12) United States Patent
Abe

(10) Patent No.: US 8,301,808 B2
(45) Date of Patent: Oct. 30, 2012

(54) INFORMATION PROCESSING APPARATUS, PERIPHERAL DEVICE CONTROL METHOD, AND STORAGE MEDIUM

(75) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/086,262

(22) Filed: Apr. 13, 2011

(65) Prior Publication Data

US 2011/0258349 A1    Oct. 20, 2011

(30) Foreign Application Priority Data

Apr. 16, 2010  (JP) ................................. 2010-095122

(51) Int. Cl.
 *G06F 3/00*   (2006.01)
(52) U.S. Cl. ........................................................ 710/14
(58) Field of Classification Search ..................... 710/14
 See application file for complete search history.

(56) References Cited

U.S. PATENT DOCUMENTS

2004/0156071 A1* 8/2004 Lay et al. ..................... 358/1.15
2005/0178821 A1* 8/2005 Ono et al. ..................... 235/375

FOREIGN PATENT DOCUMENTS

JP          2005-085132 A      3/2005

* cited by examiner

*Primary Examiner* — Henry Tsai
*Assistant Examiner* — Juanito Borromeo
(74) *Attorney, Agent, or Firm* — Canon U.S.A., Inc. IP Division

(57) ABSTRACT

The view language of a specific application can be adaptively switched in response to a language switching request from a user. If the user selects the specific application via a user interface on a peripheral device management screen, it is determined whether view language information having been set matches view language information designated and received as an argument when the specific application is selected. If it is determined that the view language information having been set does not match the view language information designated and received as the argument, view language information set beforehand in a storage unit is replaced by the view language information designated and received as the argument.

7 Claims, 16 Drawing Sheets

⟷ REPRESENTS ADDRESS BUS AND DATA BUS

FIG.4A
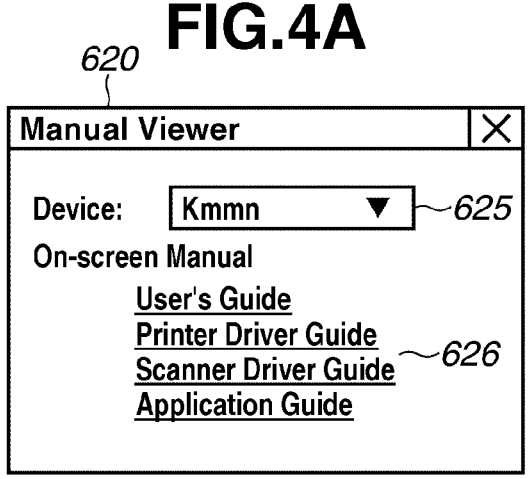
FIG.4B
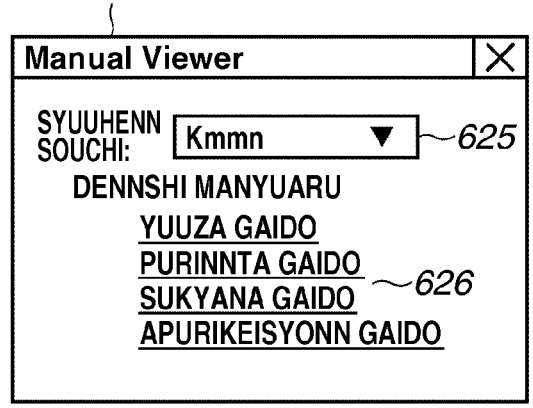
FIG.4C
C:¥Program Files¥ABC¥Manual Viewer¥
        veiwer.exe
        ABC Kmmn¥
            English¥
                manual.html
        ABC Nmmk¥
            English¥
                manual.html
        ABC Mnkm¥
            English¥
                manual.html
FIG.4D
C:¥Program Files¥ABC¥Manual Viewer¥
        veiwer.exe
        ABC Kmmn¥
            Japanese¥
                manual.html
        ABC Nmmk¥
            Japanese¥
                manual.html
        ABC Mnkm¥
            Japanese¥
                manual.html

FIG.5

```xml
<?xml version="1.0" encoding="utf-8"?>
<dm:deviceManagement xmlns:dm="http://abc.xxx/dm/control">
    <dm:manufacturer>ABC</dm:manufacturer> —801
    <dm:model>Kmmn</dm:model> —802
    <dm:functions> —803
        <dm:function id="1"> —804
            <dm:name xml:lang="en-US">Printing Preferences</dm:name> —805
            <dm:description xml:lang="en-US">Display the printing preferences window</dm:description> —806
            <dm:icon>preferences.ico</dm:icon> —807
            <dm:execute>printingPreferences "ABC Kmmn"</dm:execute> —808
        </dm:function>
        <dm:function id="2"> —809
            <dm:name xml:lang="en-US">On-screen Manual</dm:name> —810
            <dm:description xml:lang="en-US">View on-screen manual</dm:description> —811
            <dm:icon>manual.ico</dm:icon> —812
            <dm:required> —813
                <dm:keywordInRegistry key="HKLM\SOFTWARE\ABC\Manual Viewer\ABC Kmmn"
                        name="manual_path">
                    %ProgramFiles%\ABC\Manual Viewer\ABC Kmmn\English\manual.html
                </dm:keywordInRegistry> —814
            <dm:execute>
                viewer.exe "ABC Kmmn"
                "%ProgramFiles%\ABC\Manual Viewer\ABC Kmmn\English\manual.html"
            </dm:execute> —815
        </dm:function>
        <dm:function id="3"> —816
            <dm:name xml:lang="en-US">On-screen Manual</dm:name> —817
            <dm:description xml:lang="en-US">View on-screen manual</dm:description> —818
            <dm:icon>manual.ico</dm:icon> —819
            <dm:required> —820
                <dm:keywordInRegistry key="HKLM\SOFTWARE\ABC\Manual Viewer\ABC Kmmn"
                        name="manual_path">
                    %ProgramFiles%\ABC\Manual Viewer\ABC Kmmn\Japanese\manual.html
                </dm:keywordInRegistry> —821
            <dm:execute>
                viewer.exe "ABC Kmmn"
                "%ProgramFiles%\ABC\Manual Viewer\ABC Kmmn\Japanese\manual.html"
            </dm:execute> —822
        </dm:function>
    </dm:functions>
</dm:deviceManagement>
```

```xml
<?xml version="1.0" encoding="utf-8"?>
<dm:deviceManagement xmlns:dm="http://abc.xxx/dm/control">
    <dm:manufacturer>ABC</dm:manufacturer>                               ~801
    <dm:model>Kmmn</dm:model>                                            ~802
    <dm:functions>                                                       ~823
        <dm:function id="1">                                             ~824
            <dm:name xml:lang="ja-JP">INNSATSU SETTEI</dm:name>          ~825
            <dm:description xml:lang="ja-JP">INNSATSU SETTEIWO HYOUJISURU</dm:description>   ~826
            <dm:icon>preferences.ico</dm:icon>                           ~827
            <dm:execute>printingPreferences "ABC Kmmn"</dm:execute>      ~828
        </dm:function>
        <dm:function id="2">                                             ~829
            <dm:name xml:lang="ja-JP">DENNSHI MANYUARU</dm:name>         ~830
            <dm:description xml:lang="ja-JP">DENNSHI MANYUARUWO HYOUJISURU</dm:description>  ~831
            <dm:icon>manual.ico</dm:icon>                                ~832
            <dm:required>                                                ~833
                <dm:keywordInRegistry key="HKLM\SOFTWARE\ABC\Manual Viewer\ABC Kmmn"
                        name="manual_path">
                    %ProgramFiles%\ABC\Manual Viewer\ABC Kmmn\English\manual.html
                </dm:keywordInRegistry>                                  ~834
            <dm:execute>
                viewer.exe "ABC Kmmn"
                "%ProgramFiles%\ABC\Manual Viewer\ABC Kmmn\English\manual.html"
            </dm:execute>                                                ~835
        </dm:function>
        <dm:function id="3">                                             ~836
            <dm:name xml:lang="ja-JP">DENNSHI MANYUARU</dm:name>         ~837
            <dm:description xml:lang="ja-JP">DENNSHI MANYUARUWO HYOUJISURU</dm:description>  ~838
            <dm:icon>manual.ico</dm:icon>                                ~839
            <dm:required>                                                ~840
                <dm:keywordInRegistry key="HKLM\SOFTWARE\ABC\Manual Viewer\ABC Kmmn"
                        name="manual_path">
                    %ProgramFiles%\ABC\Manual Viewer\ABC Kmmn\Japanese\manual.html
                </dm:keywordInRegistry>                                  ~841
            <dm:execute>
                viewer.exe "ABC Kmmn"
                "%ProgramFiles%\ABC\Manual Viewer\ABC Kmmn\Japanese\manual.html"
            </dm:execute>                                                ~842
        </dm:function>
    </dm:functions>
</dm:deviceManagement>
```

FIG.7

```
<dm:required>
<dm:keywordInRegistry key="HKLM¥SOFTWARE¥ABC
¥Manual Viewer¥ABC Kmmn" name="manual_path">
C:¥Program Files¥ABC¥Manual Viewer¥ABC Kmmn¥
English¥manual.html</dm:keywordInRegistry>

</dm:required>
<dm:execute>viewer.exe "ABC Kmmn" "C:¥Program
 Files¥ABC¥Manual Viewer¥ABC Kmmn¥English¥man
ual.html"</dm:execute>

<dm:required>
<dm:keywordInRegistry key="HKLM¥SOFTWARE¥ABC¥
Manual Viewer¥ABC Kmmn" name="manual_path">D:
¥Program Files¥ABC¥Manual Viewer¥ABC Kmmn¥
English¥manual.html</dm:keywordInRegistry>

</dm:required>
<dm:execute>viewer.exe "ABC Kmmn" "D:¥Program
 Files¥ABC¥Manual Viewer¥ABC Kmmn¥English¥man
ual.html"</dm:execute>
...
```

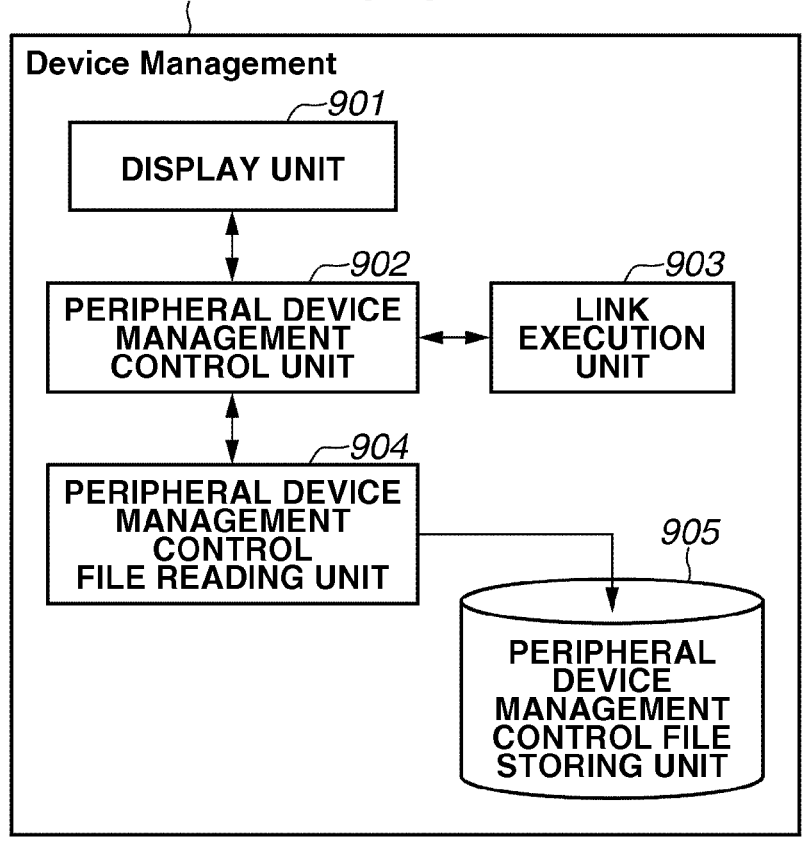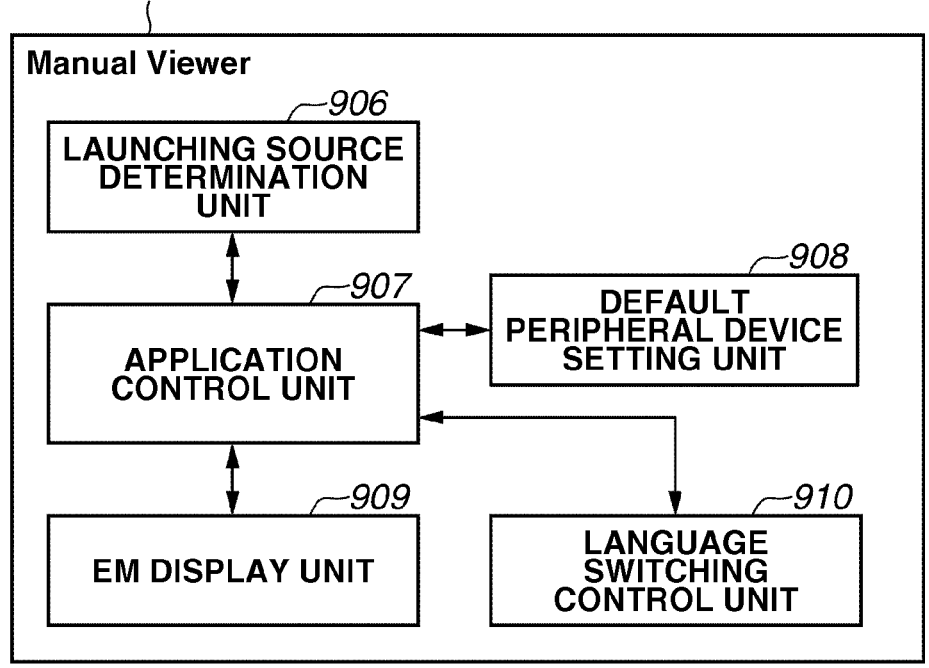

FIG.15A
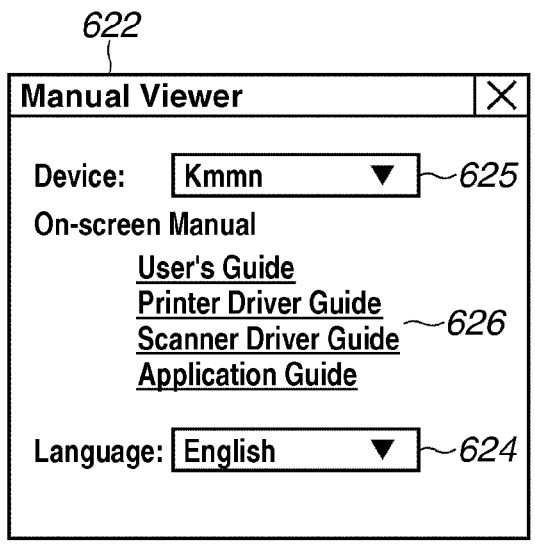
FIG.15B
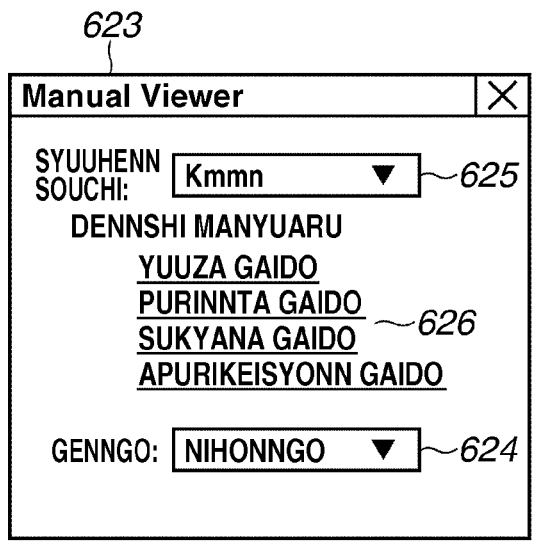
FIG.15C
C:¥Program Files¥ABC¥Manual Viewer¥
    veiwer.exe
    ABC Kmmn¥
        English¥
            manual.html
        Japanese¥
            manual.html
    ABC Nmmk¥
        English¥
            manual.html
        Japanese¥
            manual.html
    ABC Mnkm¥
        English¥
            manual.html
        Japanese¥
            manual.html

INFORMATION PROCESSING APPARATUS, PERIPHERAL DEVICE CONTROL METHOD, AND STORAGE MEDIUM

BACKGROUND OF THE INVENTION

1. Field of the Invention

The present invention relates to an information processing apparatus that can manage a peripheral device, a peripheral device control method, and a program.

2. Description of the Related Art

A peripheral device control system enables a user of an information processing apparatus to access a peripheral device via an appropriate interface, such as Universal Serial Bus (which may be referred to as USB in the following description), Ethernet®, or wireless LAN. This kind of control systems can be effectively used for various users in their houses and offices. An example of the peripheral apparatus is, for example, a printer, a copying machine, a facsimile machine, a scanner, a digital camera, or a multifunction peripheral.

Further, Windows®7 (hereinafter, referred to as W7), which is provided by Microsoft Corporation, includes newly introduced functions to manage peripheral apparatuses connected to a personal computer (hereinafter, referred to as PC) or comparable information processing apparatus.

In W7, Device Stage®can be thought of as a home page for peripheral hardware such that when a new peripheral device is connected to a PC (device running W7), a menu of tasks for the newly connected peripheral is shown in one place. Device Stage includes a "Devices and Printers folder" serving as a window that displays a peripheral device connected to the PC. Further, Device Stage® can display a link to a unique application or service provided by each peripheral device. Hereinafter, the "Devices and Printers folder" is referred to as "DP folder."

Thus, it becomes feasible to provide a task (button) on a Device Stage screen as a link to a function for displaying an electronic manual (EM) dedicated to each peripheral device. In this case, the Device Stage screen enables users to launch (execute) a manual viewer application to display an EM for an intended peripheral device.

An example of the peripheral device is a multi function peripheral (MFP) device, such as a printer with capability to scan, fax and email documents. Further, an example of the application is the manual viewer application. The manual viewer application can be used to display an EM for each peripheral device. In general, the above-described application can support a plurality of peripheral devices and a plurality of languages.

The application can display a user interface that includes a peripheral device selection field and a language selection field to enable users to select a peripheral device or select a language. Thus, each user can use a preferred language to display and execute functions of a target peripheral device.

The electronic manuals, which can be displayed by the manual viewer application, are prepared for each peripheral device using a plurality of languages with reference to a plurality of destinations thereof. A setup program determines a language of the EM for each peripheral device, when the EM is installed, with reference to a view language of the Operating System (which may be referred to as OS in the following description). Further, users may be allowed to select a preferred version (language) of the EM for each peripheral device.

If an application does not have any function for selecting a peripheral device or a language, the application constantly uses the peripheral device and the language that have been selected or designated in an installation process.

Further, if an application has a function for selecting a peripheral device or a language, the application preliminarily sets a peripheral device and a language as initial values selected or designated in an installation process. In this case, after the installation is completed, users are allowed to change the setting in a selectable range so as to designate an intended peripheral device or a preferred language.

Further, the information processing apparatus capable of performing the above-described processing is, for example, discussed in Japanese Patent Application Laid-Open No. 2005-85132.

As described above, a static text file having an Extensible Markup Language (XML) format cannot include any executable script. Therefore, performing file generation, file editing (especially, writing), generation of registry information storing setting information, and editing (especially, writing) of the registry information is difficult.

Accordingly, when a user executes a function (presses a button) on the Device Stage (peripheral device management screen), it is difficult to designate an appropriate language set by the user and execute (display) the function.

SUMMARY OF THE INVENTION

The present invention is directed to an information processing apparatus and a peripheral device control method, which can adaptively switch the display of a peripheral device application according to a language switching request from a user.

According to an aspect of the present invention, an information processing apparatus can manage a peripheral device. The information processing apparatus includes a peripheral device management unit configured to manage a peripheral device application via a peripheral device management screen to be displayed in a viewing area using peripheral device management function control information that defines information required to control each function, and a storage unit configured to store storage destination information relating to the peripheral device application. The peripheral device management unit is configured to switch the display of the peripheral device management screen using language information included in the peripheral device management function control information and language information included in the storage destination information stored in the storage unit.

According to the present invention, the information processing apparatus can adaptively switch the display of the peripheral device application according to a language switching request from a user.

Further features and aspects of the present invention will become apparent from the following detailed description of exemplary embodiments with reference to the attached drawings.

BRIEF DESCRIPTION OF THE DRAWINGS

The accompanying drawings, which are incorporated in and construct a part of the specification, illustrate exemplary embodiments, features, and aspects of the invention and, together with the description, serve to explain the principles of the invention.

FIGS. 4A to 4D illustrate UI and EM set installation states that can be displayed by the information processing apparatus according to an exemplary embodiment of the present invention.

FIG. 5 illustrates an example content of a peripheral device management control file according to an exemplary embodiment of the present invention.

FIG. 6 illustrates an example content of the peripheral device management control file according to an exemplary embodiment of the present invention.

FIG. 7 illustrates apart of a conventional peripheral device management control file.

FIG. 8 illustrates a software configuration of a peripheral device management unit and a manual viewer application according to an exemplary embodiment of the present invention.

FIGS. 15A to 15C illustrate UI and EM set installation states that can be displayed by the information processing apparatus according to an exemplary embodiment of the present invention.

DESCRIPTION OF THE EMBODIMENTS

Various exemplary embodiments, features, and aspects of the invention will be described in detail below with reference to the drawings.

Hereinafter, information relating to the W7 operating system is based on the information opened to the public, as of Nov. 5, 2009, in the following reference site 1 and therefore its detailed description is not repeated in the following exemplary embodiments.

Reference Site 1: http://msdn.microsoft.com/en-us/library/default.aspx

Further, in the context of the present disclosure, the term "USB" represents Universal Serial Bus. The description relating to the "USB" is based on the information opened to the public, as of Nov. 5, 2009, in the following reference site 2 and therefore its detailed description is not repeated in the following exemplary embodiments.

Reference Site 2: http://www.usb.org/home

Further, in the context of the present disclosure, the term "WSD" represents Web Service on Devices. The description relating to the "WSD" is based on the information opened to the public, as of Nov. 5, 2009, in the following reference site 3 and therefore its detailed description is not repeated in the following exemplary embodiments.

Reference Site 3: http://www.microsoft.com/whdc/connect/rally/rallywsd.mspx

The present invention can be effectively applied to a general application or a driver. In the present exemplary embodiment, to simplify the description, the present invention is applied to a manual viewer application that displays electronic manuals for peripheral devices, as described below in detail.

Figure 1:
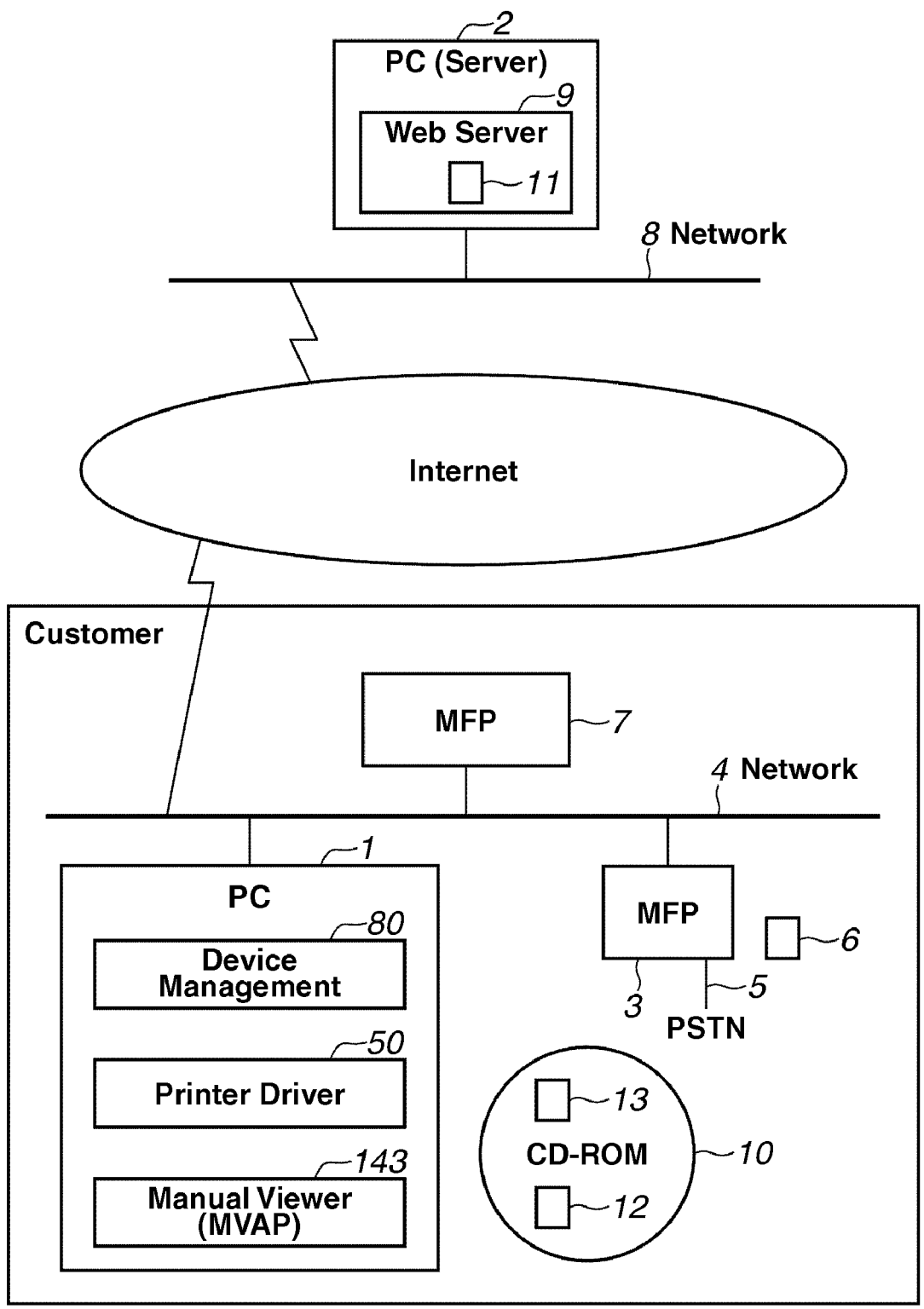
FIG. 1 illustrates an example of a system configuration of a peripheral device control system according to an exemplary embodiment of the present invention.

FIG. 1 illustrates an example of a system configuration of a peripheral device control system that includes an information processing apparatus and a peripheral device.

The information processing apparatus according to the present exemplary embodiment is functionally operable as a management unit configured to manage a peripheral device application (such as the manual viewer application) relating to a peripheral device using a user interface (hereinafter, referred to as UI). In the present exemplary embodiment, a peripheral device management unit 80 can control the interface.

Further, the information processing apparatus according to the present exemplary embodiment includes a storage unit that stores an installed operating system. The operating system manages a specific application that enables users to manage peripheral devices using user interfaces illustrated in FIG. 3. In the present exemplary embodiment, the operating system is not limited to the above-described W7 operating system and can be any other operating system comparable to the W7 operating system.

Further, an example of the peripheral device is a multi function peripheral, but may be a printer apparatus. The specific application employable in the present exemplary embodiment is, for example, the above-described manual viewer application.

Figure 2A:
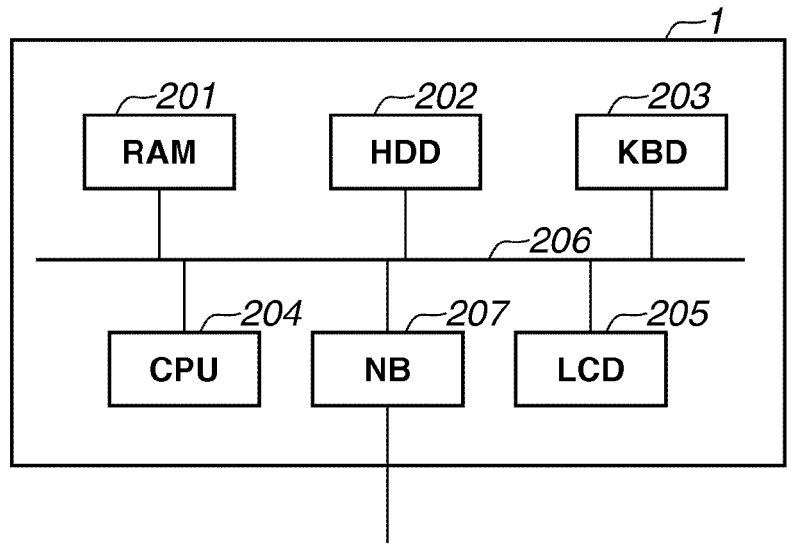
FIG. 2A illustrates an example of a hardware configuration of a personal computer according to an exemplary embodiment of the present invention.

The peripheral device control system illustrated in FIG. 1 includes two information processing apparatuses 1 and 2, each of which can be implemented by a general personal computer (which may be referred to as PC in the following description). FIG. 2A illustrates an example of a hardware configuration of the PC 1, which is also employable for the PC 2. Each of the PC 1 and the PC 2 can perform various operations according to an installed operating system (which may be referred to as OS in the following description) comparable to W7.

The PC 1 is a customer PC connected to a network 4. The PC 2 is a server PC connected to a network 8. An example of the networks 4 and 8 is Ethernet®. The peripheral device control system illustrated in FIG. 1 further includes a multi functional printer (which may be referred to as MFP in the following description. The MFP 3 is an example of the peripheral device, which is capable of operating as a color inkjet printer, a color facsimile machine, and a color scanner. The MFP 3 further includes an external storage for a flash memory.

The MFP 3 has a model name "Kmmn", and a manufacturer of the MFP 3 is ABC Corporation. The peripheral device can be a printer, a copying machine, a facsimile machine, a scanner, a digital camera, or any other apparatus having at least one of the above-described multiple functions.

Figure 2B:
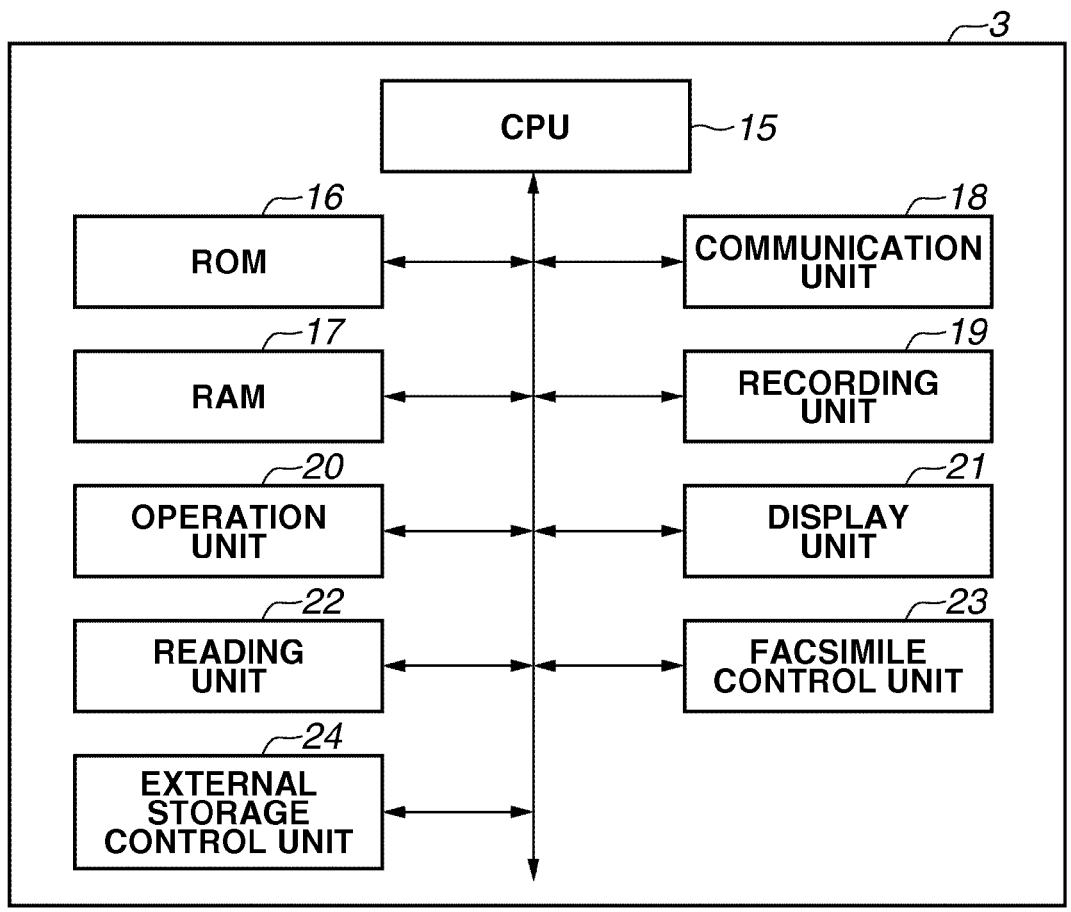
FIG. 2B illustrates an example of a hardware configuration of a multi function peripheral according to an exemplary embodiment of the present invention.

FIG. 2B illustrates an example of a hardware configuration of the MFP 3, which is connected to the customer PC 1 via the network 4. The MFP 3 can perform bidirectional communications with the customer PC 1. The customer PC 1 includes a peripheral device management application (peripheral device management unit) 80. The device management application has a file format (*.EXE) that can be executed by a personal computer operable according to an operating system, such as the Windows® operating system.

As an example of the application, the peripheral device management unit 80 is capable of displaying peripheral device management screens illustrated in FIGS. 3B and 3C as described below. The customer PC 1 further includes a printer driver 50 and a manual viewer application 143 (see FIGS. 15A, 15B, and 15C). The network 4 is a general home network that can be established in a home of a user (i.e., a client) who uses the MFP 3.

The MFP 3 is a shared MFP that can be used by a plurality of users in the home and is connected to the customer PC 1 via the network 4. The network 8 is an office network established in the ABC Corporation.

The server PC 2 connected to the network 8 includes a web server 9, which can provide a website of ABC Corporation via the internet.

A compact disc read only memory (CD-ROM) 10 is a storage medium that can be inserted into a dedicated slot of the customer PC 1 and can store software (programs) and electronic files. A destination (i.e., a place or a region where the CD-ROM 10 can be used) is set for the CD-ROM 10. Japan, North America, Europe, Oceania, and Asia are examples of the destination of the CD-ROM 10.

The web server 9 of the server PC 2 includes a file storing unit 11. The CD-ROM 10 includes a file storing unit 12. A peripheral device management control file 800, which is described below with reference to FIG. 5 and FIG. 6, is stored in and can be distributed from file storing units 11 and 12, respectively. In the present exemplary embodiment, the peripheral device management control file 800 is an example of peripheral device management function control information that defines various parameters required to control respective functions.

The MFP 3 is connected to communications network, such as the public switched telephone network (PSTN) or an analog telephone circuit 5 to enable the customer PC 1 to transmit or receive facsimile data.

A flash memory 6 can be inserted into a flash memory slot (not illustrated) of the MFP 3. The flash memory 6 is a storage medium that can be referred to by the customer PC 1. The CD-ROM 10 includes a setup program (SUP) 13, which is required to install an EM set (i.e., a set of electronic manuals). The processing that can be performed by the SUP 13 is described below in detail with reference to FIG. 9. The customer PC 1 is further connected to another MFP 7, which is a peripheral device different from the MFP 3. The MFP 7 has a model name "Defg", and a manufacturer of the MFP 7 is XYZ Corporation.

FIG. 2A illustrates an example of the hardware configuration of the customer PC 1, which is similar to the hardware configuration of the server PC 2. FIG. 2B illustrates an example of the hardware configuration of the MFP 3. As illustrated in FIG. 2A, the customer PC 1 includes a random access memory unit (RAM 201), a hard disk drive unit (HDD 202), a keyboard unit (KBD 203), and a CPU 204.

Further, the customer PC 1 includes a display device (LCD 205) and a network board (NB 207). Further, the customer PC 1 includes a bus 206 that connects the above-described constituent components to each other. The HDD 202 is an example of a storage unit. The KBD 203 is an example of an input unit.

The CPU 204 is an example of a control unit. The LCD device 205 is an example of a display unit. The NB 207 is an example of a communication control unit. Further, the storage unit may be a portable CD-ROM or a built-in ROM. The manual viewer application (hereinafter, referred to as MVAP) 143, other applications, drivers (including the printer driver 50), and various modules (software) illustrated in FIG. 8 are stored in the HDD 202.

The CPU 204 can execute (run) various drivers and applications, including the peripheral device management unit 80. The CPU 204, when executing the drivers and the applications, can realize functions of the peripheral device management unit 80, the MVAP 143, other applications, the drivers (including the printer driver 50), and various modules (software) illustrated in FIGS. 8A and 8B. The HDD 202 includes a C drive in which the operating system can be installed. The language of the operating system is selectable among a plurality of languages prepared beforehand. An operating system that corresponds to a selected language can be installed.

The MFP 3 has the hardware configuration illustrated in FIG. 2B. The MFP 3 illustrated in FIG. 2B includes a central processing unit (CPU) 15 that is generally a microprocessor. The CPU 15 of the MFP 3 can perform various operations according to programs stored in a read only memory (ROM) 16 to control a random access memory (RAM) 17, a communication unit 18, a recording unit 19, an operation unit 20, a display unit 21, a reading unit 22, a facsimile control unit 23, and an external storage control unit 24.

A program that is stored in the ROM 16 causes the MFP 3 to perform recording (print) processing according to control commands of the printer driver 50 installed on the customer PC 1 and send a notification indicating a printing operation state to the customer PC 1.

Further, a program that is also stored in the ROM 16 causes the MFP 3 to perform facsimile transmission or reception processing according to control commands of a FAX driver (not illustrated) installed on the customer PC 1 and send a notification indicating a facsimile transmission or reception state to the customer PC 1. Further, a program that is stored in the ROM 16 also causes the MFP 3 to perform image reading processing according to control commands of a WIA driver (not illustrated) or a TWAIN driver (not illustrated) installed on the customer PC 1 and send a notification indicating a reading operation state to the customer PC 1.

When the MFP 3 receives print data from the customer PC 1, the MFP 3 temporarily stores the received print data in the RAM 17. The recording unit 19 in the MFP 3 performs a print operation based on the stored print data. Further, image data read by the reading unit 22, facsimile transmission data transmitted from the customer PC 1, and facsimile reception data received by the facsimile control unit 23 are temporarily stored in the RAM 17.

The communication unit 18 includes a connection port dedicated to the network 4 via which the MFP 3 can perform Ethernet® communications, and a connection port dedicated to the analog telephone circuit 5 via which the MFP 3 can perform analog communications (e.g., facsimile transmission and reception).

The recording unit 19 includes an inkjet type recording head, color inks, a carriage, and a recording paper feeding mechanism. The recording unit 19 further includes an electric circuit, such as an application specific integrated circuit (ASIC), that controls the recording head to generate print pulses based the print data.

When a user performs a printing operation or a facsimile transmission operation via an application installed on the customer PC 1, the displayed content (image data) of an opened file is temporarily stored, as an EMF format spool file, in the HDD 202 of the customer PC 1.

Then, the spool file is converted via the printer driver 50, or the FAX driver, into print data or facsimile transmission data including commands to control the MFP 3. Then, the converted data of the spool file is transmitted to the MFP 3 via the network 4. When the MFP 3 receives the print data, the recording unit 19 converts the received print data into print pulses, and performs a printing operation on a recording paper based on the print pulses.

When the MFP 3 receives the facsimile transmission data, the facsimile control unit 23 converts the received facsimile transmission data into facsimile communication protocols, and transmits the converted communication protocols to a designated facsimile machine via the analog telephone circuit 5. The operation unit 20 includes various buttons, such as a power source button and a reset button, and enables users to operate the MFP 3.

The MFP 3 further includes a display unit 21. An example of the display unit 21 is a touch panel liquid crystal display (LCD) device. The display unit 21 can display an operational state of the MFP 3 and enables users to perform various settings and input numerical data, such as telephone numbers. The reading unit 22 includes a color image sensor and an image processing circuit (e.g., ASIC). The reading unit 22 can control a scanner function.

The facsimile control unit 23 includes a facsimile modem and an analog communication circuit. The facsimile control unit 23 can control facsimile transmission and reception processing according to facsimile communication protocols. The external storage control unit 24 includes a flash memory slot and a storage interface circuit. The external storage control unit 24 can control an attached flash memory.

Figure 3A:
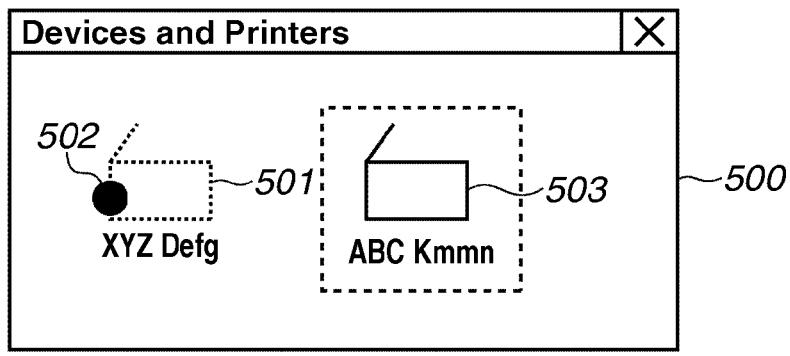
FIGS. 3A to 3C illustrate examples of user interfaces that can be displayed by an information processing apparatus according to an exemplary embodiment of the present invention.
Figure 3B:
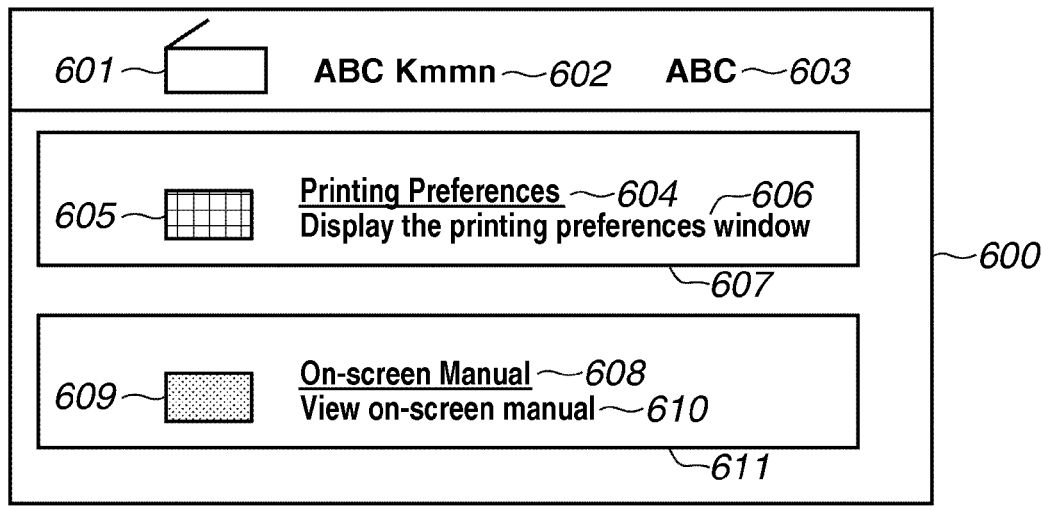
Figure 3C:
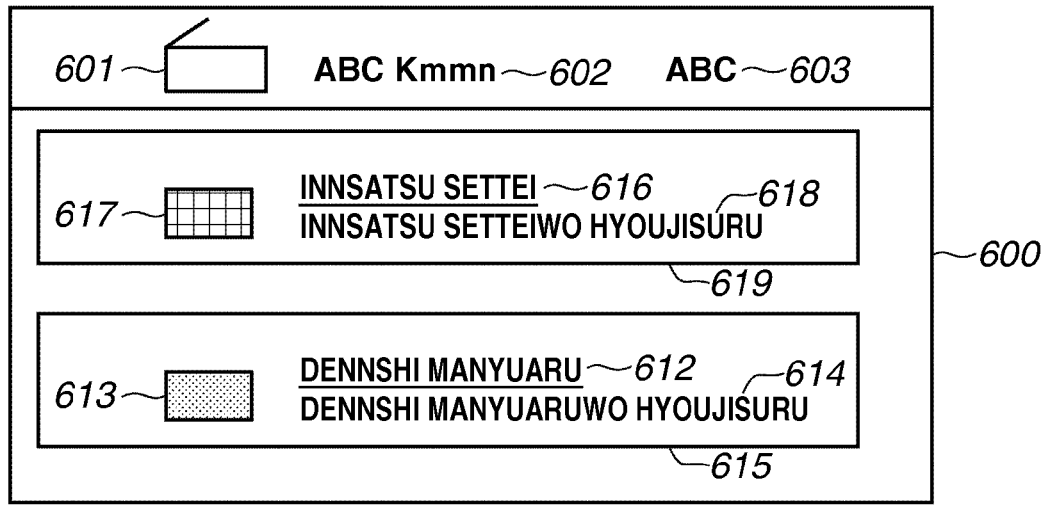

FIGS. 3A to 3C illustrate examples of user interfaces (i.e., a DP folder and peripheral device management screens). FIG. 3A illustrates a Devices and Printers folder (DP folder) 500. The DP folder 500 can be displayed on the LCD device 205 of the customer PC. Any printer or facsimile machine is displayed in the DP folder 500 for each driver if it can be used by the customer PC 1. In the present exemplary embodiment, a peripheral device 501 named as "XYZ Defg" and a peripheral device 503 named as "ABC Kmmn" are displayed as available peripheral devices.

The peripheral device 501 displayed in the DP folder 500 represents the MFP 7 illustrated in FIG. 1. The peripheral device 503 displayed in the DP folder 500 represents the MFP 3 illustrated in FIG. 1. A default mark 502 is put on a default peripheral device of the system. According to the state illustrated in FIG. 3A, the peripheral device 501 is set as the default peripheral device. In the DP folder 500, the peripheral device 501 is in an unusable state because the line type of an icon representing the peripheral device 501 is a dotted line. On the other hand, the peripheral device 503 is in a usable state because the line type of an icon representing the peripheral device 503 is a solid line.

FIG. 3B illustrates a peripheral device management screen 600. The peripheral device management screen 600 can be launched and displayed in response to a selection of the peripheral device 503 in the DP folder 500 illustrated in FIG. 3A. The peripheral device management screen 600 can be used to manage the MFP 3.

Items displayed at an upper part of the peripheral device management screen 600 are a peripheral device icon 601, a peripheral device name 602, and manufacturer information 603. Data of the peripheral device icon 601 is stored as a part of a peripheral device management control file storing unit 905 (not illustrated).

Further, information displayed in the field of the peripheral device name 602 is a character string representing the peripheral device name of the peripheral device 503 described in the DP folder 500. The information displayed in the field of the manufacturer information 603 is a character string designated in an element 801 illustrated in FIG. 5. Items displayed at a lower part of the peripheral device management screen 600 are a print setting button 607 and an EM button 611, which are links to functions relating to the peripheral device 503. More specifically, the print setting button 607 includes a button name 604, an icon 605, and a button explanation 606.

the EM button 611 includes a button name 608, an icon 609, and a button explanation 610. Information displayed in the field of the button name 608 is a character string "On-screen Manual" to be attached to the EM button to enable users to display the EM when the view language of the OS is English as described below with reference to FIG. 5. The icon 609 is dedicated to the EM button as described below with reference to FIG. 5. FIG. 3B illustrates an example display of the print setting button 607 of ID1 and the EM button 611 of ID2 or ID3, which are described in FIG. 5.

FIG. 3C illustrates another peripheral device management screen 600. The peripheral device management screen 600 illustrated in FIG. 3C can be launched and displayed in response to a selection of the peripheral device 503 in the DP folder 500 illustrated in FIG. 3A. The peripheral device management screen 600 can be used to manage the MFP 3. The peripheral device management screen 600 illustrated in FIG. 3C includes contents similar to those described with reference to FIG. 3B and therefore the descriptions thereof are not repeated.

Items displayed at a lower part of the peripheral device management screen 600 are a print setting button 619 and an EM button 615, which are links to functions relating to the peripheral device 503. More specifically, the EM button 615 includes a button name 612, an icon 613, and a button explanation 614. Information displayed in the field of the button name 612 is a character string "DENNSHI MANYUARU" to be attached to the EM button to enable users to display the EM when the view language of the OS is Japanese as described below with reference to FIG. 6.

The icon 613 is dedicated to the EM button as described below with reference to FIG. 6. FIG. 3C illustrates an example display of the print setting button 619 of ID1 and the EM button 615 of ID2 or ID3, which are described in FIG. 6. An element 803 illustrated in FIG. 5 includes elements 804, 809, and 816 each indicating button and function information. An element 823 illustrated in FIG. 6 includes elements 824, 829, and 836 each indicating button and function information.

FIGS. 4A to 4D illustrate main screen (i.e., user interface) and EM set installation states that can be displayed by the manual viewer application. FIGS. 4A and 4B illustrate examples of the main screen of the MVAP 143.

A main screen 620 of the MVAP 143 illustrated in FIG. 4A can be displayed when an English version of the EM is designated. An EM display unit 909 of the MVAP 143 illustrated in FIG. 8 displays the main screen 620 of the MVAP 143 on the customer PC 1. A main screen 621 of the MVAP 143 illustrated in FIG. 4B can be displayed when a Japanese version of the EM is designated. The EM display unit 909 of the MVAP 143 displays the main screen 621 of the MVAP 143 on the customer PC 1.

Each of the main screens illustrated in FIGS. 4A and 4B includes an EM display area 626 (viewing area) in which electronic manuals written in Hyper Text Markup Language (HTML) can be displayed. The main screen further includes a peripheral device selection field 625, which enables users to designate a desired peripheral device among a plurality of peripheral devices installed and listed up, in a case where the EM of each peripheral device is installed on the HDD 202 of the customer PC 1, and further enables users to select the EM of the designated peripheral device.

According to the main screens illustrated in FIGS. 4A and 4B, electronic manuals for the peripheral devices ABC Kmmn, ABC Nmmk, and ABC Mnkm are installed and listed to allow users to select a desired EM. According to the state illustrated in FIGS. 4A and 4B, the model name "Kmmn" representing the MFP 3 is displayed as a selected peripheral device. The EM display unit 909 displays the EM of the selected peripheral device in the EM display area 626.

FIGS. 4C and 4D illustrate examples of the EM set installation state. FIG. 4C illustrates an installation state of English version of EM sets for three peripheral devices ABC Kmmn, ABC Nmmk, and ABC Mnkm. FIG. 4D illustrates an installation state of Japanese version of the EM sets for the above-described three peripheral devices.

In FIGS. 4C and 4D, viewer.exe is an execution file of the MVAP 143, and manual.html is an HTML file of the EM for each peripheral device and each language.

When the setup program (SUP) 13 installs an EM set on the HDD 202 of the customer PC 1, the SUP 13 installs the execution file of the MVAP 143 and the HTML file of the EM whose language is identical to the view language of the OS or the language designated by a user. According to the illustrated example, the OS is installed on the C drive. As described above, the manual viewer application is roughly composed of two types of modules, i.e., execution file (viewer.exe) and content (manual.html).

In general, the execution file does not include any resource, such as a character string or a bit map image, which depends on the language. A resource depending on the language is stored in a folder prepared for each language. For example, according to the examples illustrated in FIGS. 4C and 4D, the execution file (viewer.exe) is stored in a folder "C:¥Program Files¥ABC¥Manual Viewer" and the English version electronic manual content (manual.html) is stored in a storage destination subfolder " . . . ¥ABC Kmmn¥English" of the above-described execution file (viewer.exe), which is a folder prepared beforehand as an English version content or resource storage destination.

For example, the Japanese version electronic manual content (manual.html) is stored in a storage destination subfolder " . . . ¥ABC Kmmn¥Japanese" of the above-described execution file (viewer.exe), which is a folder prepared beforehand as a Japanese version content (or resource) storage destination. A resource for each language (e.g., a character string or a bit map image) may be stored in a folder independent from the content and prepared for each language. However, in the present exemplary embodiment, it is presumed that the above-described resource is included in the content (manual.html).

The content for each language is differentiated for each language. For example, the content for each language may be differentiated only in translated character string or image. Further, the content for each language may be differentiated in character string, image, layout, and display method. Accordingly, in the manual viewer application, not only a character string translated for each language is differentiated according to the view language but also other various contents (e.g., image, layout, display method) may be differentiated.

As described with reference to FIGS. 4A to 4D, the MVAP 143 according to the first exemplary embodiment does not have the capability of switching the view language of the EM. Accordingly, if the EM of a specific language is designated according to an instruction of the SUP 13 or a user in an installation operation, the EM of the designated language is continuously displayed even when the view language of the OS is switched to another language.

FIG. 5 illustrates an example content of the peripheral device management control file. Information described in FIG. 5 (i.e., the peripheral device management control file 800) is stored in the file storing unit 11 or 12. FIG. 5 illustrates the content of the peripheral device management control file 800 to be installed on the customer PC 1 when the view language of the OS is English.

In FIG. 5, the element 801 includes a setting of a character string "ABC", which represents a manufacturer name of the peripheral device (i.e., the MFP 3). An element 802 includes a setting of a character string "Kmmn", which represents a model name of the peripheral device (i.e., the MFP 3). The above-described information can be referred to when the peripheral device management control file 800 is installed. Further, the peripheral device management control file 800 includes a description relating to screen information required to constitute the peripheral device management screen 600.

The element 803 includes button/function setting information required to display "the print setting button 607 and the EM button 611" illustrated in FIG. 3B on the peripheral device management screen 600 to be launched and displayed when the MFP 3 is connected to the customer PC 1.

The element 804 includes an attribute id="1", which indicates that the ID of the button is 1. An element 805 includes a setting of a character string "Printing Preferences" to be displayed in the field of the button name 604 that partly constitutes the print setting button 607 of ID1.

An element 806 includes a setting of a character string to be displayed in the field of the button explanation 606 that partly constitutes the print setting button 607 of ID1. An element 807 includes a setting of an icon file "preferences.ico" to be displayed in the field of the icon 605 that partly constitutes the print setting button 607 of ID1.

An element 808 includes a code setting of printingPreferences "ABC Kmmn", which indicates a function (program) capable of displaying a print setting screen (not illustrated). In the present exemplary embodiment, "ABC Kmmn" is an argument to be used to designate a print setting screen dedicated to the MFP 3. An example display of the print setting button 607 of ID1 is illustrated in FIG. 3B. If a user presses the print setting button 607 of ID1 displayed on the peripheral device management screen 600, the print setting screen dedicated to the MFP 3 can be launched and the print setting screen can be displayed.

The element 809 includes an attribute id="2", which indicates that the ID of the button is 2. An element 810 includes a setting of a character string "On-screen Manual" to be displayed in the field of the button name 608 that partly constitutes the EM button 611 of ID2.

An element 811 includes a setting of a character string "View on-screen manual" to be displayed in the field of the button explanation 610 that partly constitutes the EM button 611 of ID2. An element 812 includes a setting of an icon file "manual.ico" to be displayed in the field of the icon 609 of the EM button 611 of ID2.

An element 813 includes a description relating to view conditions of the EM button 611 of ID2. An element 814 includes a setting of registry information as the view conditions of the EM button 611 of ID2. The view conditions to be satisfied to display the EM button 611 of ID2 include the following four pieces of registry information (1) to (4).

(1) HKEY_LOCAL_MACHINE¥SOFTWARE¥ABC¥Manual Viewer¥ABC Kmmn¥
(2) Name: manual_path
(3) Type: REG_SZ
(4) Data: %ProgramFiles%¥ABC¥Manual Viewer¥ABC Kmmn¥English¥manual.html An installer of the MVAP 143 describes the above-described registry information when the MVAP 143 is installed. An uninstaller of the MVAP 143 deletes the registry information when the MVAP 143 is deleted (uninstalled). In the following description, registry differences are described with reference to the above-described items (1) to (4).

An element 815 includes a code setting of viewer.exe . . . ¥English¥manual.html", which indicates a function (program) capable of displaying the main screen 620 of the MVAP 143.

In the present exemplary embodiment, the first argument "ABC Kmmn" is an argument to be used to designate "ABC Kmmn" representing the EM for the MFP 3 in the field of the peripheral device selection field 625, as a display target EM, when the main screen 620 is displayed. The second argument "%ProgramFiles% . . . ¥English¥manual.html" is an argument to be used to designate a path indicating a storage destination of the EM to be displayed.

When the EM button 611 of ID2 is displayed on the peripheral device management screen 600, a user can press the displayed button. In response to the user's operation, an English version of the MFP 3 dedicated EM is designated in the peripheral device selection field 625 according to a flowchart illustrated in FIG. 14. Further, the main screen 620 illustrated in FIG. 4A, which displays the designated EM, is launched and displayed.

The element 816 includes an attribute id="3", which indicates that the ID of the button is 3. An element 817 includes a setting of a character string "On-screen Manual" to be displayed in the field of the button name 608 that partly constitutes the EM button 611 of ID3. An element 818 includes a setting of a character string "View on-screen manual" to be displayed in the field of the button explanation 610 that partly constitutes the EM button 611 of ID3.

An element 819 includes a setting of an icon file "manual.ico" to be displayed in the field of the icon 609 that partly constitutes the EM button 611 of ID3. An element 820 includes a description relating to view conditions of the EM button 611 of ID3.

An element 821 includes a setting of registry information as the view conditions of the EM button 611 of ID3. The view conditions to be satisfied to display the EM button 611 of ID3 include the following four pieces of registry information (1) to (4).

(1) HKEY_LOCAL_MACHINE¥SOFTWARE¥ABC¥Manual Viewer¥ABC Kmmn¥
(2) Name: manual_path
(3) Type: REG_SZ
(4) Data: . . . ¥Japanese¥manual.html The installer of the MVAP 143 describes the above-described registry information when the MVAP 143 is installed. The uninstaller of the MVAP 143 deletes the registry information when the MVAP 143 is deleted (uninstalled).

An element 822 includes a code setting of viewer.exe "ABC Kmmn" . . . ¥Japanese¥manual.html", which indicates a function (program) capable of displaying the main screen 621 of the MVAP 143.

In the present exemplary embodiment, the first argument "ABC Kmmn" is an argument to be used to designate "ABC Kmmn" representing the EM for the MFP 3 in the field of the peripheral device selection field 625, as a display target EM, when the main screen 621 is displayed. The second argument "% . . . ¥Japanese¥manual.html" is an argument to be used to designate a path indicating a storage destination of the EM to be displayed.

When the EM button 611 of ID3 is displayed on the peripheral device management screen 600, a user can press the displayed button. In response to the user's operation, a Japanese version of the MFP 3 dedicated EM is designated in the peripheral device selection field 625 and the main screen 621 illustrated in FIG. 4B, which displays the designated EM, is launched and displayed.

FIG. 6 illustrates an example content of the peripheral device management control file. Information described in FIG. 6 (i.e., the peripheral device management control file 800) is stored in the file storing unit 11 or 12. FIG. 6 illustrates the content of the peripheral device management control file 800 to be installed on the customer PC 1 when the view language of the OS is Japanese.

The peripheral device management control file 800 illustrated in FIG. 6 includes contents similar to those illustrated in FIG. 5, and therefore the descriptions thereof are not repeated in the following description. In this case, "the print setting button 619 and the EM button 615" illustrated in FIG. 3C are displayed on the peripheral device management screen 600 to be launched and displayed when the MFP 3 is connected to the customer PC 1. Therefore, the element 823 includes a setting of the elements 824, 829, and 836 each indicating button and function information.

The element 824 includes an attribute id="1", which indicates that the ID of the button is 1. An element 825 includes a setting of a character string "INNSATSU SETTEI" to be displayed in the field of a button name 616 that partly constitutes the print setting button 619 of ID1.

An element 826 includes a setting of a character string "INNSATSU SETTEIWO HYOUJISURU" to be displayed in the field of a button explanation 618 that partly constitutes the print setting button 619 of ID1. An element 827 includes a setting of an icon file "preferences.ico" to be displayed in the field of an icon 617 that partly constitutes the print setting button 619 of ID1.

An element 828 includes a code setting of printingPreferences"ABC Kmmn", which indicates a function (program) capable of displaying a print setting screen (not illustrated). In the present exemplary embodiment, "ABC Kmmn" is an argument to be used to designate a print setting screen dedicated to the MFP 3.

An example display of the print setting button 619 of ID1 is illustrated in FIG. 3C. If a user presses the print setting button 619 of ID1 displayed on the peripheral device management screen 600, the print setting screen dedicated to the MFP 3 can be launched and the print setting screen can be displayed.

The element 829 includes an attribute id="2", which indicates that the ID of the button is 2. An element 830 includes a setting of a character string "DENNSHI MANYUARU" to be displayed in the field of the button name 612 that partly constitutes the EM button 615 of ID2.

An element 831 includes a setting of a character string "DENNSHI MANYUARUWO HYOUJISURU" to be displayed in the field of the button explanation 614 that partly constitutes the EM button 615 of ID2. An element 832 includes a setting of an icon file "manual.ico" to be displayed in the field of the icon 613 that partly constitutes the EM button 615 of ID2.

An element 833 includes a description relating to view conditions of the EM button 615 of ID2. An element 834 includes a setting of registry information as the view conditions of the EM button 615 of ID2. The view conditions to be satisfied to display the EM button 615 of ID2 include the following four pieces of registry information (1) to (4).
(1) HKEY_LOCAL_MACHINE¥SOFTWARE¥ABC¥Manual Viewer¥ABC Kmmn¥
(2) Name: manual_path
(3) Type: REG_SZ
(4) Data: . . . ¥English¥manual.html The installer of the MVAP 143 describes the above-described registry information when the MVAP 143 is installed. The uninstaller of the MVAP 143 deletes the registry information when the MVAP 143 is deleted (uninstalled).

An element 835 includes a code setting of viewer.exe . . . English¥manual.html", which indicates the function (program) capable of displaying the main screen 620 of the MVAP 143. In the present exemplary embodiment, the first argument "ABC Kmmn" is an argument to be used to designate "ABC Kmmn" representing the EM for the MFP 3 in the field of the peripheral device selection field 625, as a display target EM, when the main screen 620 is displayed.

The second argument "% . . . ¥English¥manual.html" is an argument to be used to designate a path indicating a storage destination of the EM to be displayed. When the EM button 615 of ID2 is displayed on the peripheral device management screen 600, a user can press the displayed button.

Figure 14:
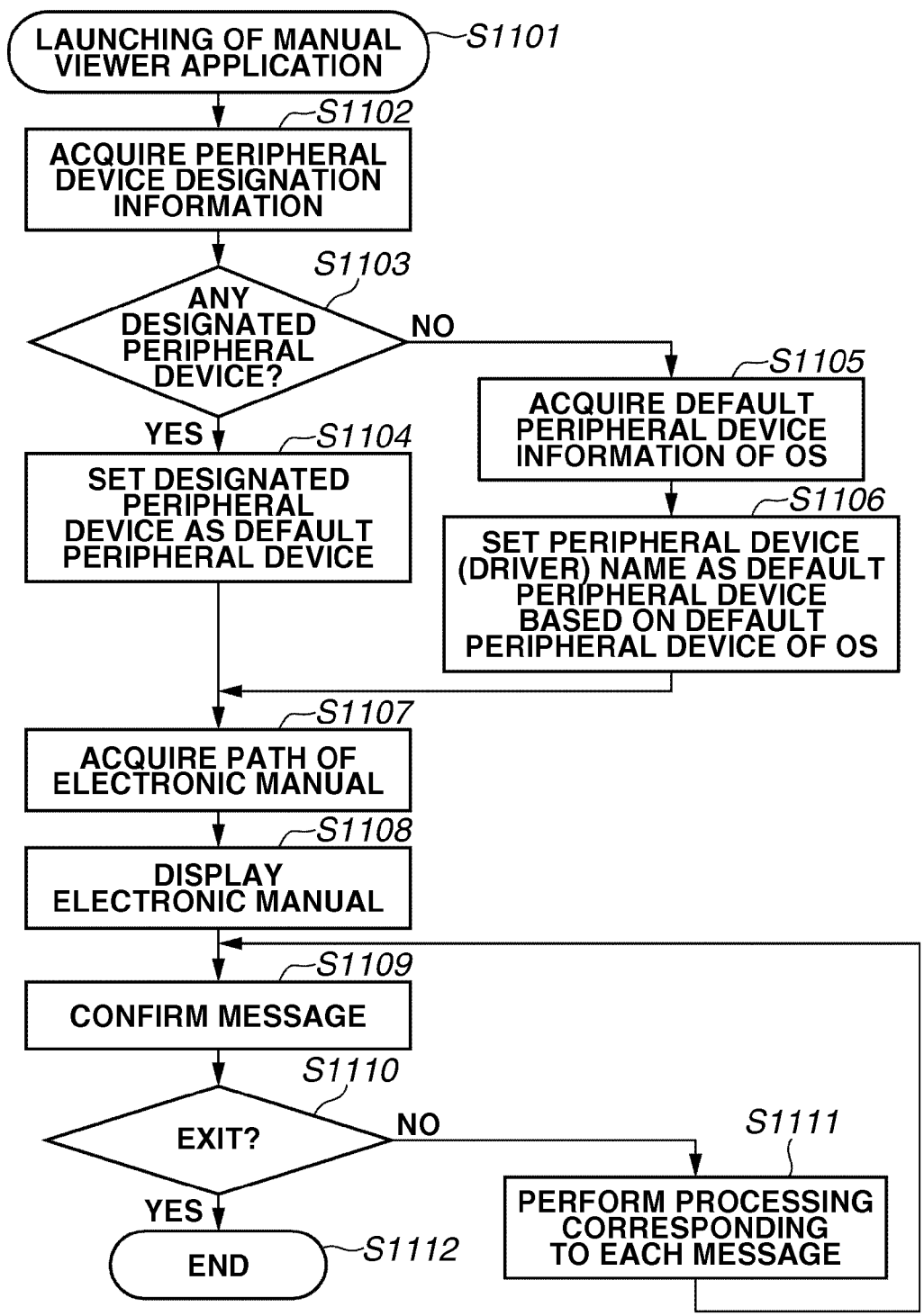
FIG. 14 is a flowchart illustrating an example procedure of data processing that can be performed by the information processing apparatus according to an exemplary embodiment of the present invention.

In response to the user's operation, the English version of the MFP 3 dedicated EM is designated in the peripheral device selection field 625 according to the flowchart illustrated in FIG. 14. Further, the main screen 620 illustrated in FIG. 4A, which displays the designated EM, is launched and displayed. The element 836 includes an attribute id="3", which indicates that the ID of the button is 3.

An element 837 includes a setting of a character string "DENNSHI MANYUARU" to be displayed in the field of the button name 612 that partly constitutes the EM button 615 of ID3. An element 838 includes a setting of a character string "DENNSHI MANYUARUWO HYOUJISURU" to be displayed in the field of the button explanation 614 that partly constitutes the EM button 615 of ID3.

An element 839 includes a setting of an icon file "manual.ico" to be displayed in the field of the icon 613 that partly constitutes the EM button 615 of ID3. An element 840 includes a description relating to view conditions of the EM button 615 of ID3. An element 841 includes a setting of registry information as the view conditions of the EM button 615 of ID3. The view conditions to be satisfied to display the EM button 615 of ID3 include the following four pieces of registry information (1) to (4).

(1) HKEY_LOCAL_MACHINE¥SOFTWARE¥ABC¥Manual Viewer¥ABC Kmmn¥
(2) Name: manual_path
(3) Type: REG_SZ
(4) Data: . . . ¥Japanese¥manual.html The installer of the MVAP 143 describes the above-described registry information when the MVAP 143 is installed. The uninstaller of the MVAP 143 deletes the registry information when the MVAP 143 is deleted (uninstalled).

The element 842 includes a code setting of viewer. exe . . . . Japanese¥manual.html", which indicates the function (program) capable of displaying the main screen 621 of the MVAP 143. In the present exemplary embodiment, the first argument "ABC Kmmn" is an argument to be used to designate "ABC Kmmn" representing the EM for the MFP 3 in the field of the peripheral device selection field 625, as a display target EM, when the main screen 621 is displayed.

The second argument "% . . . ¥Japanese¥manual.html" is an argument to be used to designate a path indicating a storage destination of the EM to be displayed. When the EM button 615 of ID3 is displayed on the peripheral device management screen 600, a user can press the displayed button. In response to the user's operation, the Japanese version of the MFP 3 dedicated EM is designated in the peripheral device selection field 625 according to the flowchart illustrated in FIG. 14. Further, the main screen 621 illustrated in FIG. 4B, which displays the designated EM, is launched and displayed.

The peripheral device management control file 800 illustrated in FIG. 5 and FIG. 6 includes a reserved word "%ProgramFiles%" of the OS. In the OS, the reserved word "%ProgramFiles%" is replaced by an absolute path of a Program Files folder of the drive on which the OS is installed. For example, when the OS is installed on the C:/drive, the reserved word "%ProgramFiles%" is replaced by the C:¥Program Files in the OS. In the present exemplary embodiment, the reserved word "%ProgramFiles%" is set as a reserved word that the operating system can recognize.

For example, when the OS is installed on the E drive, the reserved word "%ProgramFiles%" is replaced by E:¥Program Files in the OS.

Conventionally, considering the possibility that the OS can be installed in any one of all drives, a conventional peripheral device management control file is required to include, as illustrated in FIG. 7, the hard coded Program Files folder of C:/drive, D:/drive, . . . , and Z:/drive in the <dm:required> elements and the <dm:execute> elements.

According to the above-described conventional file illustrated in FIG. 7, the peripheral device management control file 800 is required a large number of <dm:required> elements and <dm:execute> elements to be described. Therefore, it may take a relatively long time (e.g., several tens of seconds) before the peripheral device management screen 600 is launched and displayed when the MFP 3 is connected to the customer PC 1. Furthermore, the peripheral device management screen 600 may not be correctly displayed.

To solve the above-described problems, it is useful to limit the number of drives on which the OS can be installed. For example, the OS can be installed on only the C drive, the D drive, and the E drive. However, in this case, if the OS is installed on an F drive or any other drive, the following problem may arise.

Even when the drive on which the EM is installed is identical to the drive on which the OS is installed, the EM button may not be displayed on the peripheral device management screen 600 and users cannot perform, on the peripheral device management screen 600, operations required to launch and display the EM.

The present exemplary embodiment uses the reserved word "%ProgramFiles%" of the OS to solve the above-described problems. As a result, in a situation where both the OS and the EM are installed on an arbitrary drive, the EM button to be pressed to view the installed EM can be displayed on the peripheral device management screen 600. Thus, when the displayed EM button is pressed, the above-described EM can be correctly displayed. The present invention can realize the peripheral device control system that is excellent in user operability as described above.

FIGS. 8A and 8B illustrate an example of software configurations of the peripheral device management unit 80 and the manual viewer application (MVAP) 143.

In FIG. 8A, the peripheral device management unit 80 includes a display unit 901, a peripheral device management control unit 902, a link execution unit 903, a peripheral device management control file reading unit 904, and the peripheral device management control file storing unit 905. The peripheral device management control file storing unit 905 stores the peripheral device management control file 800 to be stored in step S1405 illustrated in FIG. 11.

In FIG. 8B, the MVAP 143 includes a launching source determination unit 906, an application control unit 907, a default peripheral device setting unit 908, the EM display unit 909, and a language switching control unit 910. The EM display unit 909 is a module capable of controlling the EM display for a peripheral device designated in the peripheral device selection field 625 when the MVAP 143 is executed.

The EM display unit 909 performs display control for the main screens 620 and 621 illustrated in FIGS. 4A and 4B, and main screens 622 and 623 illustrated in FIGS. 15A and 15B, which are described below in a second exemplary embodiment. Processing to be performed by the language switching control unit 910 is described below in more detail in the second exemplary embodiment.

The peripheral device management screen 600 can be launched and displayed when the MFP 3 is connected via the network 4 to the customer PC 1 or when a peripheral device is selected in the DP folder 500 illustrated in FIG. 3A. In the present exemplary embodiment, it is presumed that the MFP 3 is connected via the network 4 to the customer PC 1, and the peripheral device management screen 600 illustrated in FIG. 3B or FIG. 3C is launched and displayed.

Figure 9:
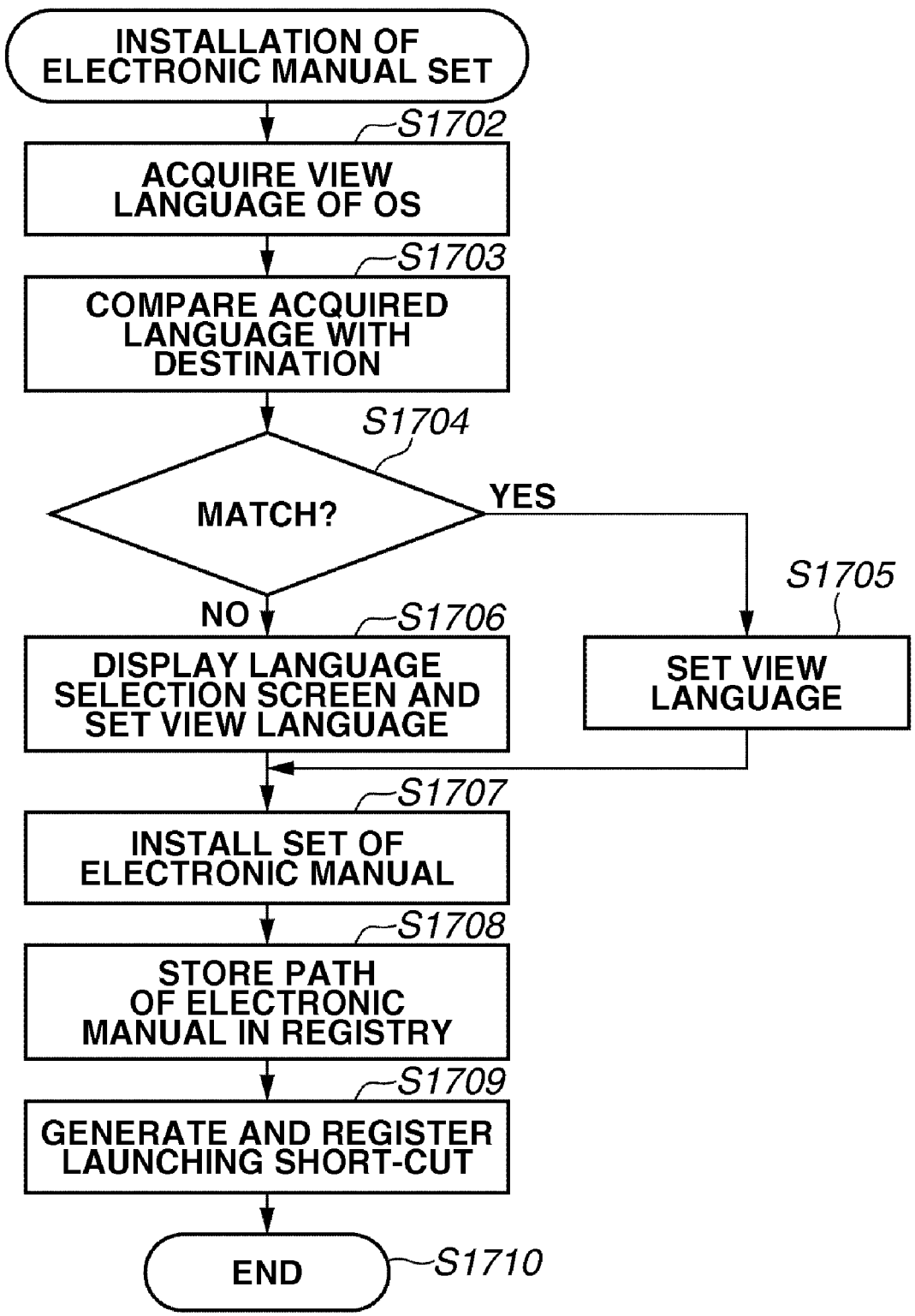
FIG. 9 is a flowchart illustrating an example procedure of data processing that can be performed by the information processing apparatus according to an exemplary embodiment of the present invention.

FIG. 9 is a flowchart illustrating an example EM set installation processing. A program relating to the flowchart illustrated in FIG. 9 is stored in the CD-ROM 10 or in the HDD 202, loaded into the RAM 201, and executed by the CPU 204. If a user inserts the CD-ROM 10 into the slot of the customer PC 1 and executes the SUP 13 in the CD-ROM 10, the SUP 13 starts the EM set installation processing illustrated in FIG. 9.

In step S1702, the SUP 13 acquires the view language of the OS. Then, in step S1703, the SUP 13 compares the acquired view language with the destination of the CD-ROM 10, i.e., the destination of the SUP 13. If the SUP 13 determines that the view language of the OS matches the above-described destination (YES in step S1704), the processing proceeds to step S1705. If the SUP 13 determines that the view language of the OS does not match the above-described destination (NO in step S1704), the processing proceeds to step S1706.

In the determination step of S1704, if the view language of the OS is Japanese and the destination of the CD-ROM 10 is Japan, the SUP 13 determines that the view language of the OS matches the above-described destination. If the view language of the OS is Japanese and the destination of the CD-ROM 10 is North America, the SUP 13 determines that the view language of the OS does not match the above-described destination.

In step S1705, the SUP 13 sets the view language of the OS as the view language of the EM. It is now presumed that the view language of the OS is Japanese and the destination of the CD-ROM 10 is North America. Further, it is presumed that the CD-ROM 10 stores an English version of the EM, a Spanish version of the EM, and a French version of the EM.

In step S1706, the SUP 13 displays a language selection screen (not illustrated). The language selection screen enables the user to select any one of the languages (English, Spanish, and French) stored in the CD-ROM 10. If the user selects a desired language on the language selection screen, the SUP 13 sets the selected language as the view language of the EM.

In step S1707, the SUP 13 installs a set of EM in the HDD 202 of the customer PC 1. The installed set of EM includes the EM corresponding to the language (view language) set in step S1705 or step S1706 in addition to the MVAP 143.

For example, if the SUP 13 installs the English version of the MFP 3 dedicated EM in a PC whose OS is installed on the C drive, the SUP 13 copies and installs the MVAP 143 and the English version of the MFP 3 dedicated EM in a predetermined folder, such as C:¥Program Files . . . ¥English¥manual.html illustrated in FIG. 4C.

In step S1708, the SUP 13 stores information indicating the path of the installed EM in the registry. For example, if the SUP 13 installs the English version of the MFP 3 dedicated EM, the SUP 13 stores information indicating the path of the EM in the registry as described below.

(1) HKEY_LOCAL_MACHINE¥SOFTWARE¥ABC¥Manual Viewer¥ABC Kmmn¥

(2) Name: manual_path (3) Type: REG_SZ (4) Data: . . . ¥English¥manual.html.

In step S1709, the SUP 13 generates a launching short-cut and registers the generated launching short-cut on a start menu. Then, in step S1710, the SUP 13 terminates the EM set installation processing illustrated in FIG. 9. Thus, the user can select the short-cut displayed on the start menu to launch the MVAP 143 and display the EM. Alternatively, as described above with reference to FIGS. 3A to 3C, the user can also press the EM button 611 or 615 to launch the MVAP 143 and display the EM. In step S1709, the short-cut is generated on the start menu, however, the short-cut may be generated on the desktop.

As described above, in the first exemplary embodiment, a set of EM whose language is identical to the view language of the OS or identical to the language designated by the user is installed on the predetermined folder.

Figure 10:
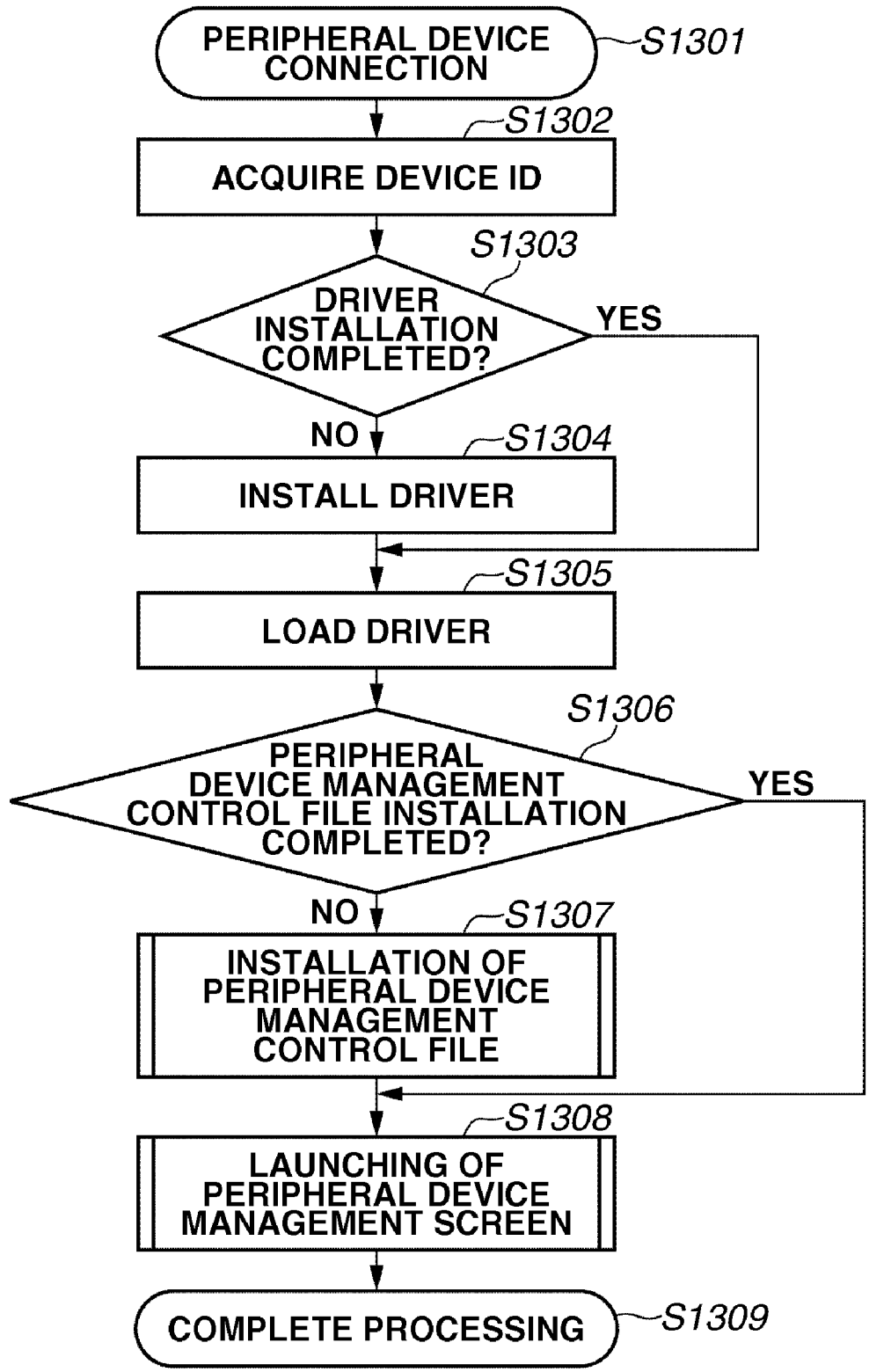
FIG. 10 is a flowchart illustrating an example procedure of data processing that can be performed by the information processing apparatus according to an exemplary embodiment of the present invention.

FIG. 10 is a flowchart illustrating an example of peripheral device connection processing. A program relating to the flowchart illustrated in FIG. 10 is stored in the HDD 202 and can be loaded into the RAM 201 when it is executed by the CPU 204.

In step S1301, the peripheral device (i.e., the MFP 3) is connected to the PC (the customer PC 1) via the network 4, then in step S1302, the customer PC 1 acquires a device ID. For example, "MFG:ABC;MDL:Kmmn;CLS:PRINTER; CMD:K4;DES:ABC Kmmn;" is an example of the device ID that is expressed using a character string. The above-described example device ID relates to a printer function of the MFP 3 and can be acquired by the customer PC 1 from the MFP 3 via the network 4. In this case, the device ID includes the following information.
Manufacturer information (MFG:): ABC
Model information (MDL:): Kmmn
Class information (CLS:): PRINTER
Command information (CMD:): K4 (ABC Corporation private print control command)
Description information (DES:): ABC Kmmn Next, in step S1303, the peripheral device management unit 80 determines whether a corresponding driver (the printer driver 50, the FAX driver, or a scanner driver (not illustrated)) is already installed on the customer PC 1. Hereinafter, in the description of FIG. 10, the driver (the printer driver, the FAX driver, or the scanner driver) is simply referred to as "driver."

If it is determined that the driver is not installed (NO in step S1303), then in step S1304, the OS installs the driver. Subsequently, in step S1305, the OS loads the driver. When the loading of the driver is successfully completed, the peripheral device (i.e., the MFP 3) is registered in the DP folder 500 illustrated in FIG. 3A.

In step S1306, the peripheral device management unit 80 determines whether the peripheral device management control file 800 illustrated in FIG. 5 is already installed on the customer PC 1. In step S1306, the peripheral device management unit 80 can check manufacturer information (MFG:) and model information (MDL:) included in the device ID to determine whether the already installed peripheral device management control file matches the driver.

If it is determined that the peripheral device management control file 800 is not yet installed (NO in step S1306), then in step S1307, the peripheral device management unit 80 executes peripheral device management control file installation processing described below with reference to FIG. 11. Subsequently, in step S1308, the peripheral device management unit 80 executes peripheral device management screen launching processing described below with reference to FIG. 12. In step S1309, the peripheral device management unit 80 terminates the peripheral device connection processing.

If the peripheral device management control file 800 is already installed (YES in step S1306), the processing proceeds to step S1308. If the driver is already installed (YES in step S1303), the processing proceeds to step S1305.

Figure 11:
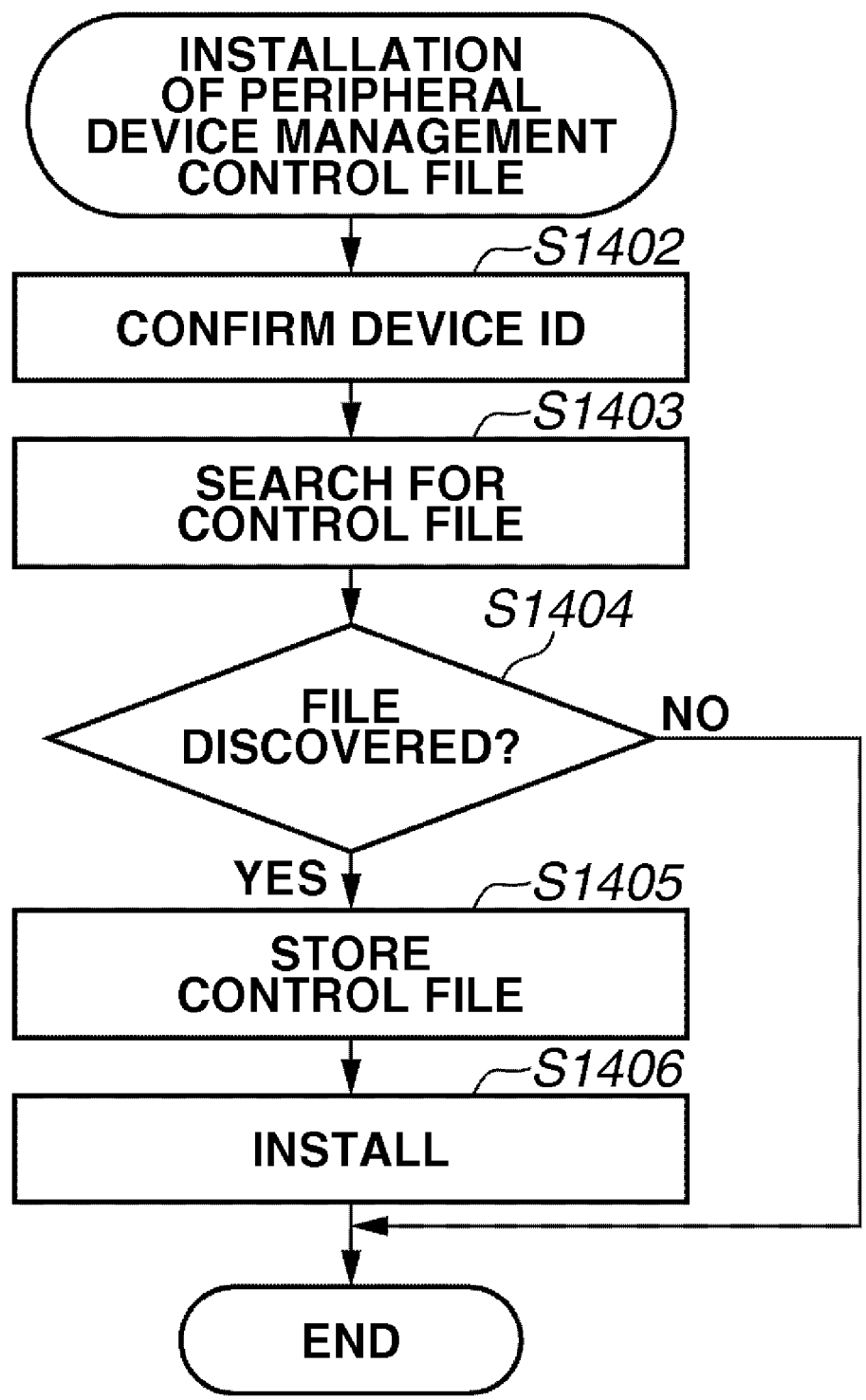
FIG. 11 is a flowchart illustrating an example procedure of data processing that can be performed by the information processing apparatus according to an exemplary embodiment of the present invention.

FIG. 11 is a flowchart illustrating an example of the peripheral device management control file installation processing. A program relating to the flowchart illustrated in FIG. 11 is stored in the HDD 202 and can be loaded into the RAM 201 when it is executed by the CPU 204.

upon execution of step S1307 of FIG. 10, the peripheral device management unit 80 starts the peripheral device management control file installation processing illustrated in FIG. 11.

First, in step S1402, the peripheral device management unit 80 confirms a device ID of the peripheral device (i.e., the MFP 3) connected via the network 4. In step S1403, the peripheral device management unit 80 searches for the peripheral device management control file 800 dedicated to the peripheral device (i.e., the MFP 3) connected to the customer PC 1 with reference to manufacturer information (MFG:) and model information (MDL:) included in the device ID. The peripheral device management control file 800 illustrated in FIG. 5 includes the element 801 that describes "ABC" as the manufacturer information (MFG:) corresponding to the peripheral device (i.e., the MFP 3). Further, the peripheral device management control file 800 includes the element 802 that describes "Kmmn" as the model information (MDL:) corresponding to the peripheral device (i.e., the MFP 3).

With reference to the information described in the element 801 and the element 802, the peripheral device management unit 80 searches for the peripheral device management control file 800 dedicated to the peripheral device (i.e., the MFP 3) from the file storing unit 11 of the web server 9 or the file storing unit 11 of the CD-ROM 10 inserted into the customer PC 1.

In step S1404, the peripheral device management unit 80 determines whether the peripheral device management control file 800 has been found from the file storing unit 11 or 12. If the peripheral device management control file 800 has been found (YES in step S1404), then in step S1405, the peripheral device management unit 80 stores the peripheral device management control file 800 in a predetermined area of the HDD 202 of the customer PC 1.

Then, in step S1406, the peripheral device management unit 80 installs the peripheral device management control file 800 in the peripheral device management control file storing unit 905. When the above-described installation processing is completed, the peripheral device management unit 80 terminates the peripheral device management control file installation processing illustrated in FIG. 11.

In the present exemplary embodiment, it is presumed that the peripheral device management control file 800 corresponding to the peripheral device (i.e., the MFP 3) has detected and installed. If the peripheral device management control file 800 has not been found (NO in step S1404), the peripheral device management unit 80 cannot install the peripheral device management control file 800, and terminates the peripheral device management control file installation processing.

Figure 12:
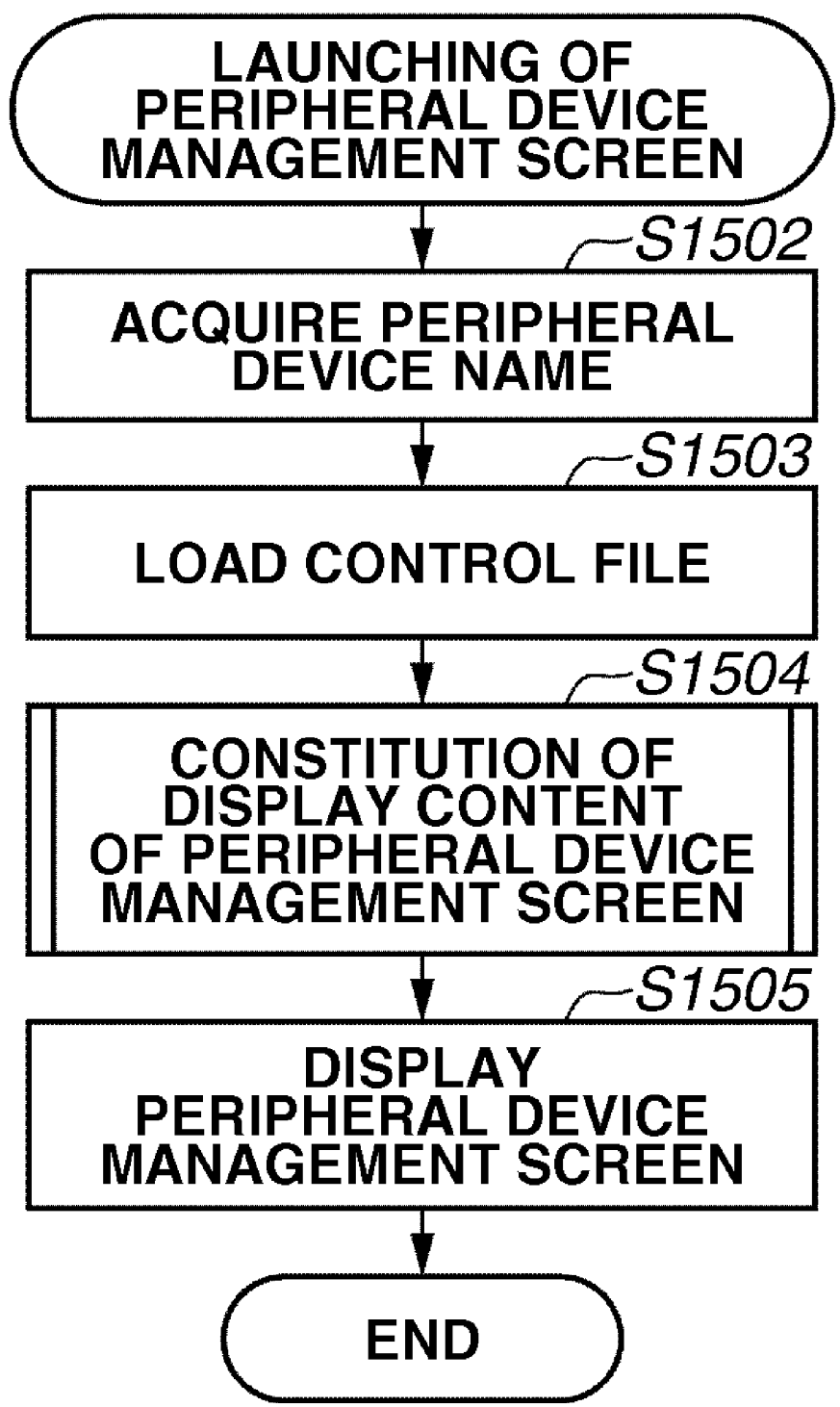
FIG. 12 is a flowchart illustrating an example procedure of data processing that can be performed by the information processing apparatus according to an exemplary embodiment of the present invention.

FIG. 12 is a flowchart illustrating an example of the peripheral device management screen launching processing. A program relating to the flowchart illustrated in FIG. 12 is stored in the HDD 202, and can be loaded into the RAM 201 when it is executed by the CPU 204.

Upon execution of step S1308 illustrated in FIG. 10, the peripheral device management unit 80 starts the peripheral device management screen launching processing illustrated in FIG. 12. Further, when the user selects the peripheral device 503 in the DP folder 500, the peripheral device management unit 80 starts the peripheral device management screen launching processing.

In step S1502, the peripheral device management control unit 902 acquires a peripheral device name selected from the DP folder 500. In the present exemplary embodiment, the selected peripheral device is the peripheral device 503. Therefore, the peripheral device management control unit 902 acquires "ABC Kmmn" as the peripheral device name. In step S1503, with reference to the acquired peripheral device name, the peripheral device management control file reading unit 904 loads the peripheral device management control file 800 illustrated in FIG. 5 (i.e., the file stored in step S1405 illustrated in FIG. 11).

In step S1504, based on the peripheral device management control file 800, the peripheral device management control unit 902 executes peripheral device management screen view content constitution processing, which is described below with reference to FIG. 13. In step S1505, the peripheral device management control unit 902 causes the display unit 901 to display the peripheral device management screen 600 according to the view content of the peripheral device management screen having been constituted in step S1504. Then, the peripheral device management unit 80 terminates the peripheral device management screen launching processing illustrated in FIG. 12.

Figure 13:
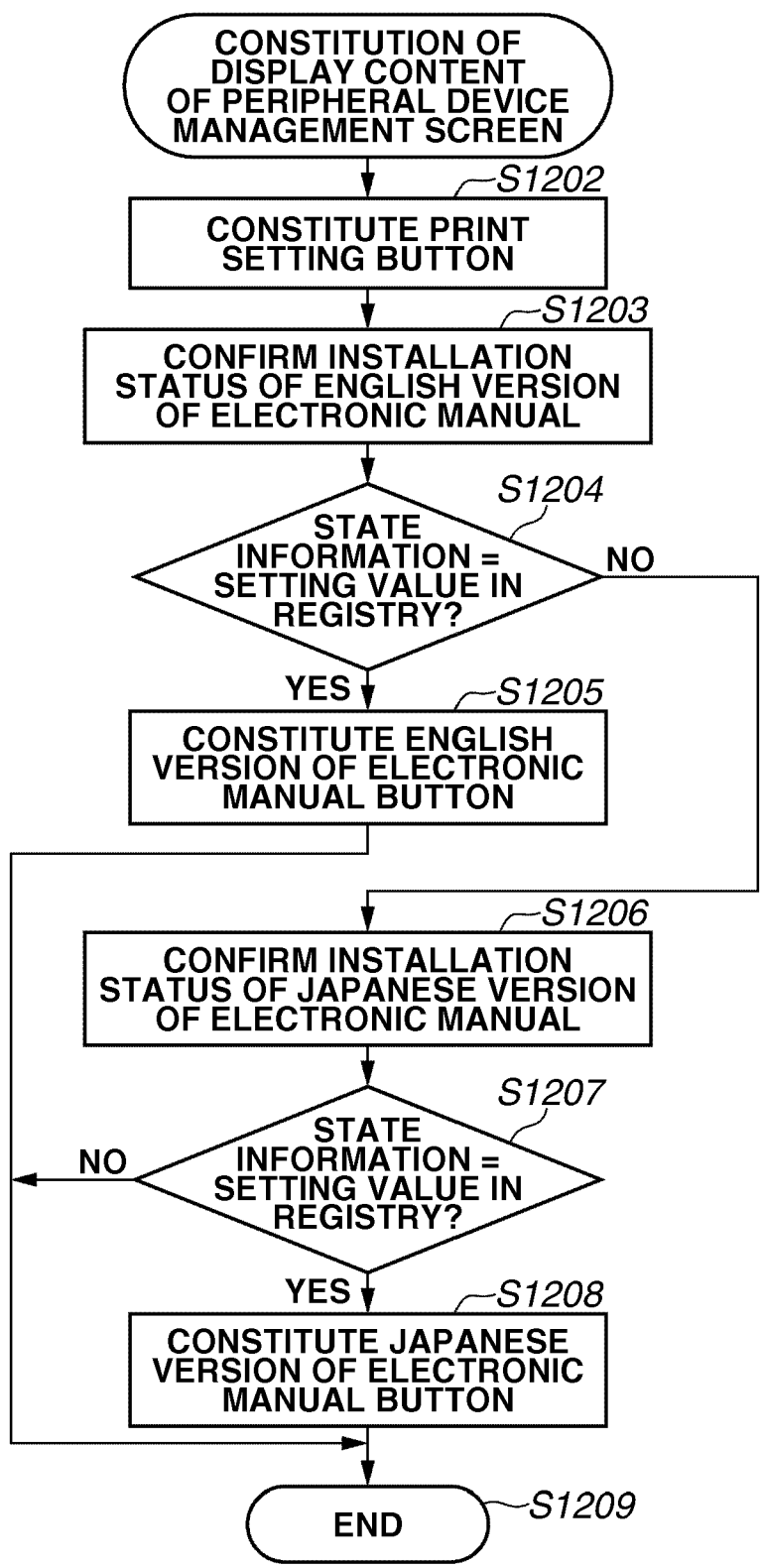
FIG. 13 is a flowchart illustrating an example procedure of data processing that can be performed by the information processing apparatus according to an exemplary embodiment of the present invention.

FIG. 13 is a flowchart illustrating an example of the peripheral device management screen view content constitution processing. A program relating to the flowchart illustrated in FIG. 13 is stored in the HDD 202 and can be loaded into the RAM 201 when it is executed by the CPU 204. Upon execution of step S1504 illustrated in FIG. 12, the peripheral device management control unit 902 starts the peripheral device management screen view content constitution processing.

In step S1202, the peripheral device management control unit 902 constitutes the print setting button 607 of ID1 (id="1"). In step S1203, the peripheral device management control unit 902 confirms an installation status of the English version of the EM. For example, in the case of MFP 3, the peripheral device management control unit 902 acquires the information representing the installation state of the EM, which is set as the value (Data) in the above-described four pieces of registry information (1) to (4), and confirms the installation status of the English version of the EM.

In step S1204, the peripheral device management control unit 902 determines whether the value (Data) set in the above-described registry matches information indicating the installation state of the English version of the EM (i.e., % . . . ¥ English¥manual.html), which is described in the element 814 illustrated in FIG. 5 or in the element 834 illustrated in FIG. 6. If it is determined that the setting value (Data) matches the information indicating the installation state of the English version of the EM (YES in step S1204), the processing proceeds to step S1205. If it is determined that the setting value (Data) does not match the information indicating the installation state of the English version of the EM (NO in step S1204), the processing proceeds to step S1206.

In step S1205, the peripheral device management control unit 902 constitutes the EM button 611 or 615 of ID2 (id="2"). In step S1209, the peripheral device management control unit 902 terminates the peripheral device management screen view content constitution processing illustrated in FIG. 13. In step S1206, the peripheral device management control unit 902 confirms an installation status of the Japanese version of the EM. For example, in the case of MFP 3, the peripheral device management control unit 902 acquires the information representing the installation state of the EM, which is set as the value (Data) in the above-described four pieces of registry information (1) to (4), and confirms the installation status of the Japanese version of the EM.

In step S1207, the peripheral device management control unit 902 determines whether the value (Data) set in the above-described registry matches the information indicating the installation state of the Japanese version of the EM (i.e., % . . . ¥Japanese¥manual.html), which is described in the element 821 illustrated in FIG. 5 or in the element 841 illustrated in FIG. 6. If it is determined that the setting value matches the information indicating the installation state of the Japanese version of the EM (YES in step S1207), the processing proceeds to step S1208. If it is determined that the setting value does not match the information indicating the installation state of the Japanese version of the EM (NO in step S1207), then in step S1209, the peripheral device management control unit 902 terminates the peripheral device management screen view content constitution processing illustrated in FIG. 13.

Then, in step S1208, the peripheral device management control unit 902 constitutes the EM button 611 or 615 of ID3 (id="3"), and terminates the peripheral device management screen view content constitution processing.

FIG. 14 is a flowchart illustrating an example of manual viewer application launching processing. A program relating to the flowchart illustrated in FIG. 14 is stored in the HDD 202, and can be loaded into the RAM 201 when it is executed by the CPU 204.

If a user presses the EM button 611 or 615 on the peripheral device management screen 600 illustrated in FIG. 3B or 3C, the CPU 204 starts MVAP 143 launching processing. In step S1101, the peripheral device management control unit 902 of the peripheral device management unit 80 illustrated in FIG. 8 sends the information described in the elements 815 and 822 illustrated in FIG. 5, or the information described in the elements 835 and 842 illustrated in FIG. 6, to the application control unit 907 via the link execution unit 903. In step S1102, the application control unit 907 acquires information designating the peripheral device (i.e., the MFP 3) represented by the first argument "ABC Kmmn" from the received information.

In step S1103, the application control unit 907 confirms the presence of the information designating the peripheral device represented by the first argument (peripheral device designation information). If it is determined that the peripheral device designation information is present (YES in step S1103), the processing proceeds to step S1104. If it is determined that the peripheral device designation information is not present (NO in step S1103), the processing proceeds to step S1105.

In the present exemplary embodiment, the information designating the peripheral device represented by the first argument described in the elements 815 and 822 illustrated in FIG. 5 or in the elements 835 and 842 illustrated in FIG. 6, designates the peripheral device. Therefore, the processing proceeds from step S1103 to step S1104. On the other hand, if the MVAP 143 is launched in a state where the first argument is not set, the processing proceeds from step S1103 to step S1105.

In step S1104, the default peripheral device setting unit 908 sets the designated peripheral device as a default peripheral device, and puts a default designation on the selected peripheral device in the peripheral device selection field 625. Then, the processing proceeds to step S1107. In step S1105, the default peripheral device setting unit 908 acquires default peripheral device information of the OS via an application/DDI interface 84.

The default peripheral device of the OS is a peripheral device on which the default mark 502 is put in the DP folder 500 illustrated in FIG. 3A. In the present exemplary embodiment, the default peripheral device set in the DP folder 500 is the peripheral device 501 (XYZ Defg). Therefore, in step S1105, the default peripheral device setting unit 908 acquires peripheral device name "XYZ Defg." In step S1106, the default peripheral device setting unit 908 sets the peripheral device (driver) name as the default peripheral device of the MVAP 143 based on the default peripheral device of OS acquired in step S1105, and puts a default designation on the selected peripheral device in the peripheral device selection field 625. Then, the processing proceeds to step S1107.

In step S1106, when the default peripheral device setting unit 908 cannot discover an appropriate peripheral device (driver) name from the default peripheral device of the OS acquired in step S1105, the default peripheral device setting unit 908 sets the peripheral device (driver) name having been set in the previous launching of the MVAP 143 as the default peripheral device. Then, the default peripheral device setting unit 908 puts a default designation on the selected peripheral device in the peripheral device selection field 625. The information relating to the default peripheral device of the MVAP 143 is stored in a memory area of the RAM 201 that is managed by the MVAP 143.

In step S1107, the application control unit 907 acquires a path indicating the storage destination of the EM represented by the second argument. In this case, the reserved word "%ProgramFiles%" of the OS defined in the second argument is replaced by the absolute path in the OS, and is sent to the application control unit 907. For example, when the OS is installed on the C drive, the reserved word %ProgramFiles% defined in the second argument is replaced by the absolute path "C:¥Program Files" in the OS, and is sent to the application control unit 907.

In step S1108, the EM display unit 909 designates the EM stored in the path of the EM acquired in step S1107, and displays the main screen 620 or 621, and further displays the EM in the EM display area 626.

In step S1109, the application control unit 907 confirms a message notified by the OS. If a termination message is received (YES in step S1110), the processing proceeds to step S1112. Then, in step S1112, the application control unit 907 closes all screens of the MVAP 143, and terminates the manual viewer application launching processing.

If the application control unit 907 receives a message other than the termination message (NO in step S1110), then in step S1111, the application control unit 907 performs processing corresponding to each message. Subsequently, the processing returns to step S1109. Thus, the CPU 204 can appropriately perform the screen display illustrated in FIGS. 3A to 3C.

In the first exemplary embodiment, the SUP 13 installs a set of electronic manuals written in the language corresponding to the view language of the OS or the language designated by a user in a predetermined folder. The MVAP 143 according to the first exemplary embodiment does not have the capability of switching the view language of the EM.

Accordingly, if the EM of a specific language is designated according to an instruction of the SUP 13 or a user in an installation operation, the EM of the designated language is continuously displayed even when the view language of the OS is switched to another language.

In the second exemplary embodiment, the MVAP 143 is configured to have the capability of switching the view language of the EM. More specifically, it is now presumed that a user switches the view language of the OS to another language, and the view language of the EM is switched to the same language correspondingly. In this case, when user presses the EM button 611 or 615 on the peripheral device management screen 600, a peripheral device control system according to the second exemplary embodiment can correctly display a set of electronic manuals written in the language expected by the user, as described below.

FIGS. 15A and 15B illustrate examples of the main screen (user interface) and the installation state of an EM set that can be displayed by the manual viewer application.

FIGS. 15A and 15B illustrate examples of the main screen of the MVAP 143. The main screens illustrated in FIGS. 15A and 15B include contents similar to those illustrated in FIGS. 4A and 4B, and therefore the descriptions thereof are not repeated in the following description. FIG. 15A illustrates the main screen 622 of the MVAP 143 to be displayed when the English version of the EM is designated. The EM display unit 909 of the MVAP 143 displays the main screen 622 on the customer PC 1. FIG. 15B illustrates the main screen 623 of the MVAP 143 to be displayed when the Japanese version of the EM is designated. The EM display unit 909 of the MVAP 143 displays the main screen 623 on the customer PC 1.

The main screens illustrated in FIGS. 15A and 15B include a language selection field 624 which enables users to select a view language of the EM to be displayed in the EM display area 626 with reference to the EMs of respective languages installed in the HDD 202 of the customer PC 1. In this respect, the language selection field 624 is functionally operable as a storage destination information designation unit.

According to the example screens illustrated in FIGS. 15A and 15B, destinations of the CD-ROM 10 are the United States and Japan. The EMs written in the following language/English/Japanese are installed and listed to enable users to select a desired language. FIG. 15A illustrates a state where English is selected in the language selection field 624, and the English version of the EM is displayed. FIG. 15B illustrates a state where Japanese is selected in the language selection field 624 and the Japanese version of the EM is displayed. In the present exemplary embodiment, the EM display unit 909 displays the EM written in the selected language in the EM display area 626.

FIG. 15C illustrates an installation state of an EM set. FIG. 15C illustrates an installation state of the English version and the Japanese version of the EM sets for three peripheral devices ABC Kmmn, ABC Nmmk, and ABC Mnkm.

In FIG. 15C, viewer.exe is an execution file of the MVAP 143, and manual.html is an HTML file of the EM for each peripheral device and each language. When the SUP 13 installs an EM set on the HDD 202 of the customer PC 1, the EM set to be installed by the SUP 13 includes the execution file of the MVAP 143 and the HTML file of the EM whose language is English or Japanese (i.e., all languages). According to the illustrated example, the OS is installed on the C drive.

An example of the processing to install the EM set on the HDD 202 of the customer PC 1, which can be performed by the SUP 13 according to the second exemplary embodiment, is described below with reference to the flowchart illustrated in FIG. 9. For example, the processing to be performed by the SUP 13 according to the present exemplary embodiment is installing specific applications corresponding to a plurality of view languages on a storage unit.

If a user inserts the CD-ROM 10 into the slot of the customer PC 1 and executes the SUP 13 in the CD-ROM 10, the SUP 13 starts the EM set installation processing illustrated in FIG. 9. Processing to be performed in step S1702 to step S1706 is similar to the processing described in the first exemplary embodiment.

In step S1707, the SUP 13 according to the second exemplary embodiment installs the EM set on the HDD 202 of the customer PC 1. In this case, according to the examples illustrated in FIGS. 15A and 15B, the EM set to be installed by the SUP 13 includes the execution file of the MVAP 143 and the HTML file of the EM whose language is English or Japanese (i.e., all languages). In step S1708, the SUP 13 according to the second exemplary embodiment stores the path of the EM for the view language having been set in step S1705 or step S1706 in the registry.

For example, in a case where the SUP 13 has installed the MFP 3 dedicated EM and the view language having been set in step S1705 or step S1706 is English, the SUP 13 stores the following four pieces of registry information (1) to (4) indicating the path of the EM in a system area of the HDD 202.
(1)
HKEY_LOCAL_MACHINE¥SOFTWARE¥ABC¥Manual Viewer¥ABC Kmmn¥
(2) Name: manual_path
(3) Type: REG_SZ (4) Data: %ProgramFiles%¥ABC¥Manual Viewer¥ABC Kmmn¥English¥manual.html Processing to be performed in step S1709 and step S1710 are similar to the processing described in the first exemplary embodiment. As the present exemplary embodiment, the peripheral device control system described in the first exemplary embodiment may be modified by simply adding the language selection field 624 illustrated in FIGS. 15A and 15B to the MVAP 143.

When a user installs the EM set dedicated to the MFP 3 on the HDD 202 of the customer PC 1, if the view language of the OS is English and the destination of the CD-ROM 10 is the United States and Japan, the SUP 13 sets the view language of the OS as the view language of the EM in step S1705 illustrated in FIG. 9. Then, in step S1708 illustrated in FIG. 9, the SUP 13 stores the following registry information indicating the path of the EM. Then, in step S1710, the SUP 13 terminates the EM set installation processing illustrated in FIG. 9.

(1) HKEY_LOCAL_MACHINE¥SOFTWARE¥ABC¥Manual Viewer¥ABC Kmmn¥
(2) Name: manual_path
(3) Type: REG_SZ
(4) Data: . . . ¥English¥manual.html.

In this state, if the user launches the peripheral device management screen 600, the peripheral device management screen 600 illustrated in FIG. 3B is displayed.

In this case, according to the flowchart illustrated in FIG. 13, the peripheral device management control unit 902 constitutes the EM button 611 of ID2 (id="2") to display the English version of the MFP 3 dedicated EM. If the user presses the EM button 611, the MVAP 143 displays the English version of the MFP 3 dedicated EM, i.e., the main screen 622 according to the second exemplary embodiment illustrated in FIG. 15A, according to the flowchart illustrated in FIG. 14.

In this state, if the user changes the view language of the EM from English to Japanese in the language selection field 624 illustrated in FIG. 15A, the view content of the main screen is switched to the Japanese version and the main screen 623 is displayed as illustrated in FIG. 15B. As described below in step S1617 illustrated in FIG. 16, the MVAP 143 stores the following registry information indicating the path of the EM.

(1) HKEY_LOCAL_MACHINE¥SOFTWARE¥ABC¥Manual Viewer¥ABC Kmmn¥
(2) Name: manual_path
(3) Type: REG_SZ
(4) Data: . . . ¥Japanese¥manual.html Subsequently, the user closes the main screen 623.

In this case, the peripheral device management screen 600 is kept in a displayed state. The EM button 611 of ID2 (id="2") to be pressed to display the English version of the MFP 3 dedicated EM is displayed on the peripheral device management screen 600.

in other words, there is a mismatch between the EM button 611 and the main screen 623 previously closed by the user in the view language of the EM. If the user presses the EM button 611 in this state, the main screen 622 illustrated in FIG. 15A (i.e., the English version of the MFP 3 dedicated EM) is displayed according to the flowchart illustrated in FIG. 14.

This is strange because the user has already changed the view language of the EM from English to Japanese in the language selection field 624 of the main screen 622, and the view language of the EM returns again to English illustrated in the main screen 622 even after the user has switched the view language of the EM to the main screen 623 illustrated in FIG. 15B.

If the above-described screen display is performed, the user will be confused in determining an instruction to be input on the main screen 622. Considering the above-described problem, the second exemplary embodiment intends to realize a peripheral device control system capable of solving the above-described problem and excellent in user operability.

Figure 16:
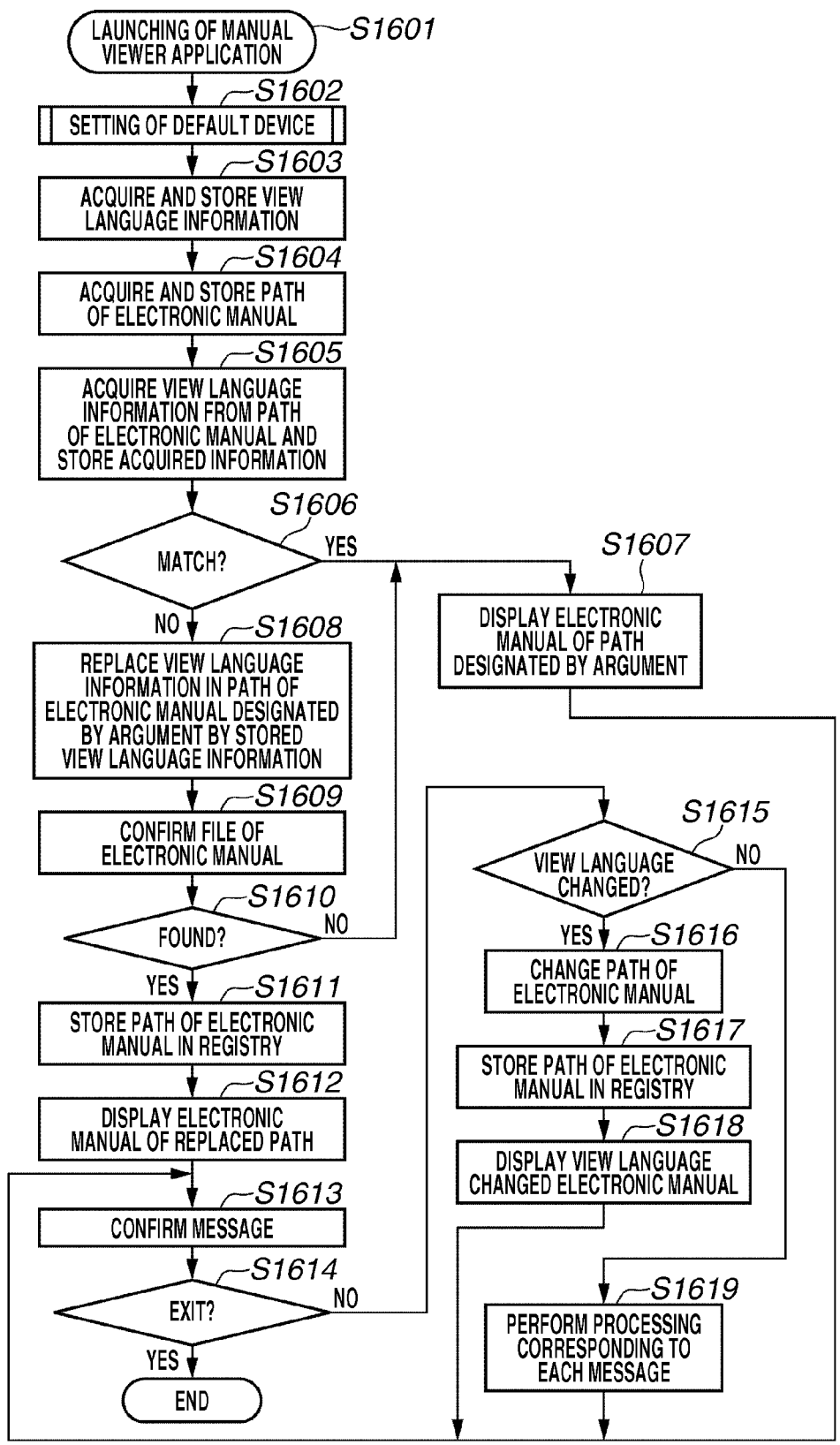
FIG. 16 is a flowchart illustrating an example procedure of data processing that can be performed by the information processing apparatus according to an exemplary embodiment of the present invention.

FIG. 16 is a flowchart illustrating an example of the manual viewer application launching processing. A program relating to the flowchart illustrated in FIG. 16 is stored in the HDD 202, and can be loaded into the RAM 201 when it is executed by the CPU 204. Hereinafter, an example control that can be performed by the manual viewer application to switch the display on the UI screen illustrated in FIG. 15 is described below in detail.

If a user presses the EM button 611 or 615 on the peripheral device management screen 600, the CPU 204 starts MVAP 143 launching processing. In step S1601, the peripheral device management control unit 902 of the peripheral device management unit 80 illustrated in FIG. 8 sends the information described in the elements 815 and 822 illustrated in FIG. 5 or the elements 835 and 842 illustrated in FIG. 6, to the application control unit 907 via the link execution unit 903. In step S1602, based on the information received in step S1601, the application control unit 907 and the default peripheral device setting unit 908 execute each processing of step S1102 to step S1106 illustrated in FIG. 14.

In step S1603, the language switching control unit 910 acquires the information indicating the view language of the EM via the path of the EM (first storage destination information) stored in the registry. Then, the language switching control unit 910 stores the acquired information in the memory area of the RAM 201 that is managed by the MVAP 143.

For example, it is now presumed that the following four pieces of registry information (1) to (4) are present.

(1) HKEY_LOCAL_MACHINE¥SOFTWARE¥ABC¥Manual Viewer¥ABC Kmmn¥
(2) Name: manual_path
(3) Type: REG_SZ
(4) Data: . . . ¥Japanese¥manual.html In this case, the language switching control unit 910 acquires the information "Japanese" that indicates the view language of the EM from % . . . ¥Japanese¥manual.html. Then, the language switching control unit 910 stores the acquired information in the memory area of the RAM 201 of the RAM 201.

In step S1604, the application control unit 907 acquires the path indicating the storage destination of the EM represented by the second argument (second storage destination information). Then, the application control unit 907 stores the acquired information in the memory area of the RAM 201 that is managed by the MVAP 143. In this case, the reserved word "%ProgramFiles%" of the OS in the second argument is replaced by the absolute path in the OS and is sent to the application control unit 907.

For example, when the OS is installed on the C drive, the reserved word %ProgramFiles% in the second argument is replaced by the absolute path C:¥Program Files (third storage destination information) in the OS and is sent to the application control unit 907.

In step S1605, the language switching control unit 910 acquires view language information via the path of the EM (electronic manual information storage destination information) acquired by the application control unit 907 in step S1604. Then, the language switching control unit 910 stores the information indicating the acquired view language of the EM in the memory of the RAM 201 that is managed by the MVAP 143.

For example, when the path of the EM is C:¥Program . . . ¥ English¥manual.html, the language switching control unit 910 acquires information "English" indicating the view language of the EM and stores the acquired information in the memory of the RAM 201.

In step S1606, the language switching control unit 910 compares the EM view language information received from the user and stored in step S1603 with the EM view language information acquired from the registry in step S1605. The language switching control unit 910 determines whether the view language information stored in step S1603 matches the view language information acquired in step S1605.

If the language switching control unit 910 determines that the compared view language information matches (YES in step S1606), the processing proceeds to step S1607. If it is determined that the compared view language information does not match (NO in step S1606), the processing proceeds to step S1608. In this respect, the processing in step S1606 corresponds to a language information comparison based determination step in the present exemplary embodiment.

In step S1607, the EM display unit 909 designates the EM stored in the EM path of the registry stored in step S1604, and displays the main screen 622 or 623 illustrated in FIG. 15. Further, the EM display unit 909 displays the EM in the EM display area 626. Then, the processing proceeds to step S1613. Thus, if the view language selected when the EM is installed is English and the view language information received from the user is English, the EM display unit 909 displays the English version of the EM.

On the other hand, if the view language information received from the user in step S1606 does not match the view language information included in the storage destination information in the registry (NO in step S1606), the processing proceeds to step S1608.

Then, in step S1608, the language switching control unit 910 generates a path of the EM by replacing the EM view language information included in the EM path stored in step S1604 by the EM view language information included in the EM path acquired from the registry stored in step S1603.

Hereinafter, it is presumed that the view language information (second language information) received from the user is Japanese, and the information indicating the storage destination of the EM (first language information) set in the registry is English. In other words, the following description is based on the example described in step S1604 and step S1603.

The language switching control unit 910 replaces "English" included in the EM path C:¥ . . . ¥ English¥manual.html stored in step S1604 by "Japanese" to generate an EM path C:¥Program . . . . Japanese¥manual.html.

In step S1609, the language switching control unit 910 confirms the presence of the HTML file of the EM with reference to a folder designated by the EM path generated in step S1608. In step S1610, the language switching control unit 910 determines whether the HTML file of the EM is present in the above-described folder. If it is determined that the HTML file of the EM is present (YES in step S1610), the processing proceeds to step S1611. If it is determined that that the HTML file of the EM is not present (NO in step S1610), the processing proceeds to step S1607.

In step S1611, the language switching control unit 910 stores information indicating the EM path generated in step S1608 in the registry. For example, in the above-described example, the language switching control unit 910 stores the following four pieces of registry information (1) to (4) indicating the path of the EM in the system area of the HDD 202.
(1) HKEY_LOCAL_MACHINE¥SOFTWARE¥ABC¥Manual Viewer¥ABC Kmmn¥
(2) Name: manual_path
(3) Type: REG_SZ
(4) Data: . . . ¥Japanese¥manual.html In step S1612, the EM display unit 909 designates the EM stored in the EM path generated by replacing the information indicating the view language of the EM in step S1608, and displays the main screen 622 or 623 illustrated in FIG. 15A or FIG. 15B, and then executes display control to display the EM in the EM display area 626.

In step S1613, the application control unit 907 confirms a message notified by the OS. If a termination message is received (YES in step S1614), the application control unit 907 closes all screens of the MVAP 143, and terminates the manual viewer application launching processing.

On the other hand, if the application control unit 907 receives a message other than the termination message (NO in step S1614), then in step S1615, the application control unit 907 receives a view language switching request from the user.

If the user switches the view language of the EM in the language selection field 624 and the language switching control unit 910 receives a view language change message (YES in step S1615), the processing proceeds to step S1616. If the language switching control unit 910 receives a message other than the view language change message (NO in step S1615), then in step S1619, the application control unit 907 performs processing corresponding to each message. Subsequently, the processing returns to step S1613.

In step S1616, the language switching control unit 910 acquires the information indicating the path of the EM stored in the registry and changes, in the acquired information, the information indicating the EM path with reference to the information indicating the view language of the EM having been changed and designated by the user. For example, it is now presumed that the user changes the view language of the EM from Japanese to English in the language selection field 624 in a case where the following four pieces of registry information (1) to (4) are stored to indicate the path of the EM.
(1) HKEY_LOCAL_MACHINE¥SOFTWARE¥ABC¥Manual Viewer¥ABC Kmmn¥
(2) Name: manual_path
(3) Type: REG_SZ
(4) Data: . . . ¥Japanese¥manual.html In this case, the language switching control unit 910 changes "Japanese" representing the view language of the EM in the information indicating the EM path to "English" and changes the information indicating the EM path to % . . . ¥English¥manual.html.

In step S1617, the language switching control unit 910 stores information indicating the EM path changed in step S1616 in the registry. For example, according to the above-described example, the information stored by the language switching control unit 910 is the following four pieces of registry information (1) to (4).
(1) HKEY_LOCAL_MACHINE¥SOFTWARE¥ABC¥Manual Viewer¥ABC Kmmn¥
(2) Name: manual_path
(3) Type: REG_SZ
(4) Data: . . . ¥English¥manual.html.

In step S1618, the EM display unit 909 designates the EM stored in the path of the EM, which can be obtained by replacing the reserved word by the absolute path of the OS installation destination drive, based on the information indicating the EM path obtained by changing the information indicating the EM view language in step S1616.

In the present exemplary embodiment, the reserved word is %ProgramFiles%. Then, the EM display unit 909 displays the main screen 622 or the main screen 623 illustrated in FIG. 15A or FIG. 15B, and executes display control to displays the EM in the EM display area 626. In other words, the EM display unit 909 displays the EM written in the view language having been changed and designated by the user in the language selection field 624. Then, the processing returns to step S1613.

The following is the reason why, in step S1608, the language switching control unit 910 replaces the information indicating the EM view language stored in step S1604 by the information indicating the EM view language stored in step S1603 and generates the path of the EM (including third language information). For example, at the termination timing of the previously launched MVAP 143, the device selected in the peripheral device selection field 625 may be "ABC Mnkm" (i.e., not the MFP 3).

In the above-described situation, the user may press the EM button 611 or the EM button 615 on the peripheral device management screen 600. In this case, even when the user performs an operation to display the MFP 3 dedicated EM, the language switching control unit 910 performs the above-described replacement processing to correctly display the MFP 3 dedicated EM while solving the problem described in the beginning of the second exemplary embodiment. As described above, even when the MVAP 143 has the capability of switching the view language of the EM, the second exemplary embodiment can realize the peripheral device control system that is excellent in user operability. For example, a set of EM is installed in the PC, installation processing is executed according to the flowchart illustrated in FIG. 9, and in step S1709, a short-cut is generated in the start menu or on the desk top. At that time, the content of the short-cut is as follows.

viewer.exe "ABC Kmmn" "C:¥Program Files¥ABC¥Manual Viewer¥ABC Kmmn¥English¥manual.html"

Now, it is assumed that the user starts the MVAP 143 by using the short-cut and an English version of the EM is displayed. At this time, the user operates to change the display language of the MVAP 143 and EM to Japanese by operating the language selection field 624, and the processing in steps S1615 to S1618 in FIG. 16 are executed. Then, the user temporarily closes the MVAP 143. Thereafter, the user activates the peripheral device management screen 600. Then, the processing proceeds to step S1206 (NO in step S1204), step S120, and step S1208 (YES in step S1207). In step S1208, the peripheral device management control unit 902 constitutes the EM button 611 or 615 of ID3 (id="3"). Thus, the peripheral device management screen 600, which includes the EM button 611 or 615 for displaying the Japanese version of EM, is displayed. As described above, even when MVAP 143 is started from the EM button 611 or 615 on the peripheral device management screen 600, the display language that is changed on the MVP 143 is correctly reflected. Therefore, the user can obtain an excellent operability.

Further, the present invention can be realized by executing the following processing. More specifically, the processing includes supplying a software program capable of realizing the functions of the above-described exemplary embodiments to a system or an apparatus via a network or an appropriate storage medium. The processing further includes enabling a computer (or CPU or micro-processing unit (MPU)) of the system or the apparatus to read and execute the program.

Further, the peripheral device management unit 80 illustrated in FIG. 8 is an example of the application in the above-described exemplary embodiments. However, the application is not limited to the above-described example. It is feasible and may be effective to use any other arbitrary application capable of realizing similar functions. Further, the MVAP 143 illustrated in FIG. 8 is an example of the application in the above-described exemplary embodiments. However, the manual viewer application is not limited to the above-described example. It is feasible and may be effective to use any other arbitrary application capable of supporting a plurality of peripheral devices and languages.

Further, the information processing apparatuses described in the above-described exemplary embodiments are personal computers. However, the information processing apparatuses are not limited to the above-described examples. For example, the present invention can be applied to Digital Versatile Disc (DVD) players, games, set top box (STB), Internet connected home appliances, and any other arbitrary information processing apparatuses (terminals) operable according to the similar usage method. Further, the peripheral devices described in the above-described exemplary embodiments are multi function peripherals. However, the peripheral devices can be copying machines, facsimile machines, scanners, digital cameras, or any other apparatuses having at least one the above-described multiple functions.

Further, the OS described in the above-described exemplary embodiments is comparable to the Windows® 7. However, the OS is not limited to the above-described example and can be any other arbitrary OS.

Further, the network 4 described in the above-described exemplary embodiments is Ethernet®. However, the network 4 is not limited to the above-described example and can be any other arbitrary network.

Further, in the above-described exemplary embodiments, the interface between the customer PC 1, the MFP 3, and the MFP 7 is Ethernet®. However, the interface is not limited to the above-described example and can be any arbitrary interface (e.g., wireless LAN, IEEE1394, Bluetooth, or USB).

Further, the web service protocol described in the above-described exemplary embodiments is the WSD. However, the web service protocol is not limited to the above-described example and can be any arbitrary protocol (e.g., IHV unique protocol). Further, in the above-described exemplary embodiment, if the EM button 611 or 615 is pressed on the peripheral device management screen 600, the MVAP 143 is launched and the EM is displayed in a state where an appropriate peripheral device (driver) is set. However, the present invention is not limited to the above-described example. For example, an appropriate peripheral device (driver) name or a file path can be designated and executed when an arbitrary application is launched via the peripheral device management screen, an arbitrary website is linked, or a service is provided.

In this case, instead of designating a storage destination of an application or a driver, a storage destination of content (file, resource, etc.) to be referred to by the application can be designated.

Further, in the above-described exemplary embodiments, when the EM button is pressed on the peripheral device management screen 600, the MVAP 143 is launched and the EM is displayed. However, the present invention is not limited to the above-described example, and is applicable to driver functions of the printer driver 50. For example, it may be useful that the peripheral device management screen 600 includes a button that can be pressed to launch a status monitor 39 of the printer driver 50. In this case, it is useful to use an appropriate view language to perform the display of the above-described function, namely, when the status monitor 39 is launched and displayed.

Further, in the above-described exemplary embodiments, the language selection field 624 is provided to enable users to switch the view language of the EM to be displayed in the EM display area 626 of the MVAP 143. However, the present invention is not limited to the above-described example. For example, the present invention is applicable to an application that can switch the view language of the EM to be displayed in the EM display area 626 in association with the view language of the OS.

Further, in the above-described exemplary embodiments, the SUP 13 or the language switching control unit 910 stores the information indicating the path of the EM in the registry and automatically switches the view language of the EM based on the stored information. However, the present invention is not limited to the above-described example. For example, the present invention is applicable to an application that can store information indicating the view language in the registry and automatically switch the view language of the application based on the stored information.

Further, the information storage registry used in the above-described exemplary embodiments is HKEY_LOCAL_MACHINE that can be applied to all users in the PC.

However, the present invention is not limited to the above-described example. For example, the information storage registry can be HKEY_CURRENT_USER dedicated to a log-in user. In particular, using the registry HKEY_CURRENT_USER is useful when a view language switching function is available as described in the second exemplary embodiment, because the view language may be differentiated for each user of the PC.

Further, it may be useful to combine the usage of the registry HKEY_CURRENT_USER and the usage of the registry HKEY_LOCAL_MACHINE and select one of the above-described registries based on the priority order. For example, the first priority is given to HKEY_CURRENT_USER and the second priority is given to HKEY_LOCAL_ MACHINE.

In this case, for example, immediately after the installation is completed, it is feasible to launch and display an application or a driver using the view language selected in the installation operation, as an initial usage environment common to all users, based on the information stored in the registry HKEY_LOCAL_MACHINE. Then, after the application or the driver is actually used, it is allowed to launch and display the application or the driver using an appropriate view language, based on the information stored in the registry HKEY_CURRENT_USER, according to the usage environment of each user.

As described above, the system according to the exemplary embodiments can provide peripheral device management screens capable of providing appropriate functions and screen views according to the usage environment of each user. Further, when the application is launched to control a peripheral device, the system according to the above-described exemplary embodiments can appropriately and accurately control the peripheral device taking the usage environment of each user into consideration.

Therefore, the system according to each of the above-described exemplary embodiments can provide appropriate functions and screen views according to the usage environment of each user.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-095122 filed Apr. 16, 2010, which is hereby incorporated by reference herein in its entirety.

What is claimed is:

1. An information processing apparatus capable of managing a peripheral device, the apparatus comprising:
a peripheral device management unit configured to manage a peripheral device application via a peripheral device management screen to be displayed in a viewing area using peripheral device management function control information that defines information required to control each function;
a storage unit configured to store storage destination information relating to the peripheral device application;
a storage destination information designation unit configured to externally designate the storage destination information; and
a language information comparison unit configured to compare first language information included in first storage destination information designated by the storage destination information designation unit with second language information included in second storage destination information stored in the storage unit,
wherein the peripheral device management unit is configured to switch the display of the peripheral device management screen using language information included in the peripheral device management function control information and the second language information, and
the peripheral device application switches a view content of the viewing area using the first storage destination information when the first language information matches the second language information, and using third storage destination information, which can be generated by replacing the first language information included in the first storage destination information by the second language information, when the first language information does not match the second language information.

2. The information processing apparatus according to claim 1, wherein the peripheral device application is a manual viewer application that can display manual information relating to the peripheral device.

3. The information processing apparatus according to claim 1, wherein a reserved word that can be recognized by an operating system is used to describe the storage destination information relating to the peripheral device application.

4. A peripheral device control method for an information processing apparatus capable of managing a peripheral device, the method comprising:
- managing a peripheral device application via a peripheral device management screen to be displayed in a viewing area using peripheral device management function control information that defines information required to control each function;
- storing storage destination information relating to the peripheral device application in a storage unit;
- externally designating the storage destination information; and
- comparing first language information included in first storage destination information externally designated with second language information included in second storage destination information stored in the storage unit,
- wherein the display of the peripheral device management screen is switched using language information included in the peripheral device management function control information and the second language information, and
- the peripheral device application switches a view content of the viewing area using the first storage destination information when the first language information matches the second language information, and using third storage destination information, which can be generated by replacing the first language information included in the first storage destination information by the second language information, when the first language information does not match the second language information.

5. A non-transitory computer-readable storage medium storing a program that causes a computer to execute the peripheral device control method defined in claim 4.

6. The method according to claim 4, wherein the peripheral device application is a manual viewer application that can display manual information relating to the peripheral device.

7. The method according to claim 4 wherein a reserved word that can be recognized by an operating system is used to describe the storage destination information relating to the peripheral device application.

* * * * *